United States Patent [19]
Garloff et al.

[11] Patent Number: 5,699,310
[45] Date of Patent: Dec. 16, 1997

[54] METHOD AND APPARATUS FOR A FULLY INHERITED OBJECT-ORIENTED COMPUTER SYSTEM FOR GENERATING SOURCE CODE FROM USER-ENTERED SPECIFICATIONS

[75] Inventors: Gary W. Garloff; Kevin S. McKee, both of Kingwood; S. Mark Coats, Houston; Ted C. Poock, Kingwood, all of Tex.

[73] Assignee: Dynasty Technologies, Inc., Kingwood, Tex.

[21] Appl. No.: 187,345

[22] Filed: Jan. 26, 1994

Related U.S. Application Data

[63] Continuation-in-part of Ser. No. 54,835, Apr. 30, 1993, abandoned, which is a continuation of Ser. No. 546,351, Jun. 29, 1990, abandoned.

[51] Int. Cl.⁶ .................................................. G06F 9/46
[52] U.S. Cl. ............................................................ 395/701
[58] Field of Search ................................................. 395/700

[56] References Cited

U.S. PATENT DOCUMENTS

| | | |
|---|---|---|
| 4,315,315 | 2/1982 | Kossiakoff . |
| 4,374,408 | 2/1983 | Bowles et al. . |
| 4,389,706 | 6/1983 | Gomola et al. . |
| 4,455,619 | 6/1984 | Masui et al. . |
| 4,533,997 | 8/1985 | Furgerson . |
| 4,536,840 | 8/1985 | Borta . |
| 4,546,435 | 10/1985 | Herbert et al. . |
| 4,636,948 | 1/1987 | Gdaniec et al. . |
| 4,656,603 | 4/1987 | Dunn . |
| 4,730,315 | 3/1988 | Saito et al. . |
| 4,734,854 | 3/1988 | Afshar . |
| 4,742,467 | 5/1988 | Messerich et al. . |
| 4,809,170 | 2/1989 | Leblang et al. . |
| 4,831,580 | 5/1989 | Yamada . |
| 4,866,610 | 9/1989 | Reiners . |
| 4,922,432 | 5/1990 | Kobayashi et al. . |
| 4,956,773 | 9/1990 | Saito et al. . |
| 4,965,741 | 10/1990 | Winchell et al. . |
| 5,075,847 | 12/1991 | Fromme . |
| 5,115,501 | 5/1992 | Kerr . |
| 5,159,687 | 10/1992 | Richburg .................................. 395/700 |
| 5,295,222 | 3/1994 | Wadhwa et al. . |

OTHER PUBLICATIONS

"A/D Cycle," American Programmer, Ed Yourdon's Software Journal, vol. 2, No. 12, Dec. 1989, pp. 3–27.
A. F. Case, "Information Systems Development Principles of Computer Aided Software Engineering," Prentice Hall (1986).
J. Gray, "OOP Aids Programmers in OEMs, VARs, ISVs," Computer Technology Review, vol. X, No. 10, pp. 8, 9 and 11 (Aug. 1990).
D. Pountain, "Object Oriented Programming," Byte Magazine (Feb. 1990).
R. J. Welke, "Meta Systems on Meta Models," Case Outlook, vol. 89, No. 4, pp. 35–44 (1989).
G. Wilkie, "Object–Oriented Software Engineering," Addison–Wesley Publishing Co., Chapters 1, 2, 3 and 5 (1993).
"Learn Object–Oriented Programming While You Play Video Poker," PC Magazine, pp. 239–315 (Feb. 27, 1990).
"Metagen," METAgen Concepts & Components, pp. 1–9 (Jul. 18, 1989).
"Understanding and Programming in Object–Oriented PASCAL," PC Magazine, pp. 263–284 (Feb. 27, 1990).
Trimarand, Inc., Product Brochure, "METAgen Product Description," publication date unknown.

*Primary Examiner*—Thomas M. Heckler
*Attorney, Agent, or Firm*—Crowell & Moring LLP

[57] ABSTRACT

A computer system wherein object-oriented management techniques are used with a new means for generating code to provide for the automatic generation of source code. The invention includes three executable components: an inheritance engine that provides a detailed, fully inherited view of individual objects; an Operator Interface that allows a software Developer to provide a program specification; and a generator for generating source code for a computer system. The inheritance engine obtains objects from Design Knowledge Bases, Specification Knowledge Bases and Generation Knowledge Bases for the Generator. The Generator then operates on the objects to produce source code.

69 Claims, 29 Drawing Sheets

/*THIS METHOD IS INVOKED WHENEVER A USER CLICKS ON A ROW IN THE LISTBOX NAMED MYLISTBOX*/
/*IT RETRIEVES THE SELECTED ROW'S DATA FROM THE LISTBOX, DETERMINES WHETHER ANY ROW IS SELECTED,*/
/*AND SETS THE BUTTON MYBUTTON TO ENABLED IF SOMETHING IS SELECTED AND TO DISABLED IF NOTHING IS SELECTED*/

LISTBOXDATA = SEND(GETSELECTEDROWDATA, SELF.MYLISTBOX)
IF(SEND(ISVALID, LISTBOXDATA))
    /*SOMETHING HAS BEEN SELECTED IN THE LIST BOX*/
    SEND(SETENABLE, SELF.MYBUTTON);
ELSE
    /*NOTHING IS SELECTED*/
    SEND(SETDISABLE, SELF.MYBUTTON);
END

*FIG. 14*

/* THIS CODE FRAGMENT INSTRUCTS THE GENERATOR TO DETERMINE HOW MANY ATTRIBUTE VALUES HAVE BEEN ENTERED FOR THE ATTRIBUTE EDITABLELISTBOXDEF.POSTPROCESSMETHOD. IF ANY VALUES HAVE BEEN ENTERED, THEN EXECUTE THE DEVELOPER'S LANGUAGE SENDIF STATEMENT.

THE RESULT OF THIS CODE FRAGMENT IS TO IMPLEMENT AN OPTIONAL METHOD USED FOR POSTPROCESSING. IF THE OPTIONAL ATTRIBUTE POSTPROCESSMETHOD IS FILLED IN, THEN IT WILL BE EXECUTED BY THIS CODE FRAGMENT.
*/

.IF(.GETNUMVALUES(ATT:EDITABLELISTBOXDEF.POSTPROCESSMETHOD) NOT = 0)
  SENDIF(ATT:EDITABLELISTBOXDEF.POSTPROCESSMETHOD, SELF, ROWDATA);
.END

START → DEFINE FOR A METHOD → FORM AN IMOD → IS THIS METHOD TARGETED FOR RPC?

- Y → PRODUCE THE C FUNCTION THAT WILL INITIATE AND RECEIVE THE RESULTS OF THE RPC
- N → CAN A NOTIFICATION BE USED?
  - Y → PRODUCE THE SOURCE TO DEFINE THE MESSAGE SELECTOR
  - N → GENERATE THE DEFINITION OF THE C FUNCTION THAT WILL IMPLEMENT THE METHOD

→ CALL EXECUTESCRIPT() FOR THE SCRIPT OF THIS METHOD TO GENERATE THE C CODE FOR THIS METHOD → END THE IMOD → RETURN

| TYPE | SOME VALID CLASSES |
|---|---|
| WINDOW | WINDOW |
| | MODALWINDOW |
| VIEW | BUSINESSVIEW |
| PROGRAM | PROGRAM |
| | APPLICATION |
| WIDGET | LISTBOX |
| | TEXTEDIT |
| | PUSHBUTTON |
| | RADIOBUTTON |
| | ETC. |
| DATA | INTEGER |
| | LONGINTEGER |
| | FLOAT |
| | DATAHANDLE |
| | STRUCTUREDEF |
| | ENUMDEF |
| | ETC. |

*FIG. 25*

METHOD AND APPARATUS FOR A FULLY INHERITED OBJECT-ORIENTED COMPUTER SYSTEM FOR GENERATING SOURCE CODE FROM USER-ENTERED SPECIFICATIONS

This application is a continuation-in-part of application Ser. No. 08/054,835, filed on Apr. 30, 1993, abandoned, which is a continuation of application Ser. No. 07/546,351, filed on Jun. 29, 1990, abandoned.

MICROFICHE

The attached microfiche appendix contains approximately 89 sheets of microfiche which comprise approximately 8,715 frames.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

All figures herein are subject to copyright protection. The computer code in the attached microfiche appendix is also subject to copyright protection. The portion of the written description subject to copyright protection has been defined by placing one copyright notice just prior to the beginning of the copyrighted portion, and placing a second copyright notice just after the end of the copyrighted portion. The date of publication of the copyrighted material is the date of issuance of this patent.

BACKGROUND

1. Field of the Invention

The present invention relates to computer systems for generating source code.

2. Background of the Invention

Traditionally, computer software has been written one line of code at a time. The code is then compiled and linked to produce executable object code. Much code is still written this way today.

Two different approaches have been developed to improve this traditional process: Object-Oriented Languages and Code Generators. With an Object-Oriented Language, a computer programmer still writes one line of code at a time. The language, however, provides a number of run-time features that help the programmer re-use objects that have been created. An object is created that has all the functionality of a pre-defined class. This concept is called Inheritance, i.e., the object inherits all the functions of a certain class of objects. An object is a collection of data and functional logic. Objects, classes and inheritance are discussed in the textbook "Object-Oriented Software Engineering," George Wilkie, Addison-Wesley Publishing Co. (1993), which is incorporated by reference herein.

Code generators have traditionally operated in one of two ways: macro expansion or template with replacements. Macro expansions provide a language that expands into a number of source code statements. This language is still written one line at a time, but may generate multiple lines of source code at a time. For example, a GetRecord macro may expand into a read, a check for an end of file, and a copy into a working buffer. Template with replacements provide a higher-level but less flexible means of code generation. A template provides the outline for the code. The template is defined with options for replacing or adding to some of the parameters or functionality in the template. For example, a MasterFileProcessing template may have all of the code needed to perform a master file update, with sorts, matches, and updates already coded. File names and keys are replaced in the template, producing a section of code for the overall program.

It is difficult for a team of programmers to work on the same project using Object Oriented Programming because even a simple project may produce tens of thousands of objects. Each object does not define that object's functionality completely—it only defines the changes and additions made to the object's "parent" object. Thus an individual programmer may well be working in the dark, because the programmer may not fully understand a particular object. In order to fully understand a single object, the programmer must fully understand each of the ancestors in the object's hierarchy, how the classes interact, and how they override each other. With tens of thousands of objects created even in a small project, this task hinders the large-scale use of Object Oriented Programming.

In some systems, each object has a single class to inherit from. Similar functions may therefore be defined in many different classes. Some computer systems address this problems by implementing Multiple Inheritance, i.e., they allow an object to inherit from multiple classes. Multiple Inheritance, however, results in extremely complex class hierarchies that are very difficult to maintain.

Both code generation technologies—macro expansion or template with replacements—impose severe limits on the platforms supported, languages used, and flexibility of a language. In addition, coding is often done on a line-by-line basis, although each line may end up generating a large amount of code. Neither of these technologies makes use of Object Oriented Programming, or provides opportunities for platform independence, i.e., independence of the particular hardware, software, operating system, operating environment, database or communications environment.

The present invention overcomes these problems by using many of the concepts of Object Oriented Programming in a code generator. The present invention provides for the use of classes by a team of programmers and provides tools for managing objects. *Copyright Dynasty Technologies, Inc.*

SUMMARY OF THE INVENTION

The present invention implements a new object management structure in a new means of generating code. The present invention uses Object Oriented management to ease the process of specifying a program and to facilitate the re-use of objects. The new means of generating code uses objects that define how they are to be generated.

The present invention has three executable components. The inheritance engine provides a detailed, fully inherited view of individual program objects. The Operator Interface allows a Developer to change and add to the objects to provide a program specification. The generator uses the fully inherited view of objects, together with the Developer's changes to the objects, to generate source code for a computer system.

The source code includes, in addition to the program source code, MAKE files for maintaining and compiling the source code, HELP files for user Help, and other components required for third-party use of the compiled program.

The Inheritance Engine.

FIG. 1A shows how the inheritance engine is used in the present invention. The left-hand side of FIG. 1A shows that the inheritance engine provides a Developer, via the Operator Interface, with a fully inherited view of objects from the Design Knowledge Base and the Specification Knowledge Base. As shown on the right-hand side of FIG. 1A, the inheritance engine also uses objects obtained from the Generation Knowledge Base to create objects having a fully inherited view. These logically separate Knowledge Bases may be physically separate files or may be combined into a single file, without affecting the operation of the specification and generation process.

The Operator Interface and the Generator use the Inheritance Engine to provide a view of an object in which all of the object's components can be seen. The Operator Interface handles all of the interactions between the Developer and the different parts of the system. The Developer can also use the Operator Interface to add his own specifications to the Specification Knowledge base.

The right-hand side of FIG. 1a shows that the generator receives a fully inherited view of objects from the Inheritance Engine. An object containing a fully inherited view of the object is termed an "Effective Object." The inheritance engine obtains the objects from the Design Knowledge Bases and the Specifications Knowledge Bases, and uses Generation Rules from the Generation Knowledge Bases to create source code. The Knowledge Bases contain the rules and specifications needed to generate source code. The Design Knowledge Base contains class libraries and process models which drive the specification process. The Specification Knowledge Base contains the objects used in the generated application, and the Generation Knowledge Base contains the rules needed to generate source code from the specifications.

Knowledge Bases.

FIG. 1B shows the three knowledge bases used with the present invention. It uses three types of logical knowledge bases: the Design Knowledge Base, the Specification Knowledge Base, and the Generation Knowledge Base. The Design Knowledge Base contains the Class Libraries and Process Models that the Developer uses to create the specifications for his program. The Specification Knowledge Base contains the Developer's specifications. The Generation Knowledge Base contains the rules and directions for generating source code from the specifications. FIG. 1C shows that the generation process produces a source code file containing program source code, a help source, program documentation, MAKE files, Link Response files and other build-related files.

All three types of Knowledge Bases store all of the design, specification, and generation components as objects.

Objects.

All objects have similar components. FIG. 11 is a model of an object. Each object inherits characteristics from a class (which is in actuality another object) and is made up of Sub-objects, Scripts, Process Models, Attribute Sets, Attribute Value Sets and Methods.

A Sub-object is an object wholly owned by another object.

Process Models are essentially collections of Methods.

Attribute Sets pose "questions" about an object that are used when generating source code.

Attribute Value Sets are the corresponding "answers" to the questions. Attribute Sets are defined as part of each object and process model.

Scripts are a series of Statements, which can be parsed into Expressions. Each Expression may be evaluated separately by the Generator and cause the Generator to invoke some operation, as shown in FIG. 7. One or more Expressions make up a Statement, which is a complete operation. For example, the Statement A=B+C has the expression B+C and has the implied expression A=(result of B+C). The generator first evaluates B+C, then assigns the result to A. Thus the Statement A=B+C includes two Expressions.

Statements may be used either in the Modeler's language, to direct the Generator to perform some action, or in the Developer's language, to define the functionality of the code that will be generated.

Each Method that contains Developer Language script can generate code for three purposes: (1) to generate the section of code that will implement the functionality described by the Script, (2) to implement a reference to (or "Call to") the section of code that is generated, and (3) to declare the section of code to the compiler. When C is generated, for example, the Method script will become a function, the references to the Method may become function calls (they may also become RPC calls or in line code), and the declarations will become function prototypes in the header or include files.

To perform these different tasks, each Method has Methods attached to it. The "define" Method causes the functionality of the owning Method's script to be generated. The "genCall" Method causes the appropriate code to be generated to call the generated section of code. The "declare" Method causes the appropriate declaration to be output for the generated section of code.

Process Models.

Process Models are essentially collections of Methods. The Methods are used to add functionality to an object. For example, a Process Model may be added to a Window to provide the functionality needed to start another Window. By adding a Process Model, we are adding the Methods needed to perform a specific task. Process Models provide the architecture for managing multiple class hierarchies and for facilitating reuse.

Note that Process Models are objects that are designed to be inherited by other objects.

The Specifications.

The Developer writes the specifications and stores them in the Specifications Knowledge Base. The Specifications Knowledge Base is a concatenated structure that helps a Developer (either the Developer who originally wrote the object, or another Developer) find and re-use the appropriate objects.

Specifications consist of objects and supporting Classes, Process Models and Functions that are used to fully define the functionality and operations of the application that is being built (the Target Application). Specification of objects entails filling in Attribute Values, adding Subobjects, adding Process Models, modifying Methods, and adding Methods. The Developer may choose to create some Classes and Process Models that make the specifications clearer or easier to complete. These Classes and Process Models, then, may be considered a part of the specification. A Developer may also choose to create or use Functions as part of the Specifications.

Object Management.

Object management is implemented using object types, developer-controlled flags to identify classes, sub-objects, procedures for defining the visibility of objects, and lists of Process Models that are appropriate for an object to use.

Objects are broken into major object types, including Window, Business, View, DataManager, DataStore, Widget, etc. This helps limit the lists of objects that a Developer must review to find and re-use objects.

Each object has a Developer-controlled flag that indicates whether the object is to be used as a class. This helps the Developer control the use of classes and Objects.

Sub-objects are a new concept for object management. Sub-objects reduce the number of objects that are relevant to a particular operation. For example, any given Object A may have sub-objects that are only accessible when Object A is referenced. When searching for an object to use, Object A's sub-objects will be removed from object lists, making object selection easier. Sub-objects are not listed in global lists of objects. Sub-objects are accessed by specifying the "root" object name and the direct path of objects to the sub-object. The use of sub-objects can drastically reduce the size of object lists and facilitate re-use.

The visibility of each object is defined in the Knowledge Base, so that the Developer never sees the Methods that are not relevant to the application. For example, the Generator uses a genSend Method with many methods. However, no genSend Methods are ever visible to the Developer. This separates the Methods used to specify an application from the Methods used to generate code, and thus limits the information that the Developer must review and understand.

Each object has a list of the Process Models that are appropriate for that object to use. This limits the Process Models a Developer must review to the Process Models that will actually work with the object. Process Models thus compress the class hierarchy and facilitate the creation of objects.

Code Generation.

In the present invention, code generation is unique, because instead of the more traditional Macro expansion or Template means of code generation, each object contains Methods that specify how the Generator is to generate the code. When a message is sent to an object's Method, Methods that are connected to the target Method are invoked by the Generator to determine how to reference the object and Method. A reference to a Method is determined by the language that is being generated. In C, the reference may be generated as inline code, as a function call, as a Message that is implemented in the native windowing environment, or as a Remote Procedure Call (RPC).

The Methods in the objects are written in either the Developer's language or the Modeler's language. The Developer's language defines the functions to be performed. The Modeler's language directs the Generator on how to generate the code to perform the functions. Both the Developer's language and the Modeler's language are entered using the Operator's Interface (shown in FIG. 2).

The present invention separates the Design Rules (stored in the Design Knowledge base), the Developer's Specifications (stored in the Specification Knowledge Base), and the Generation Rules (stored in the Generation Knowledge Base). This separation makes the specifications independent of target language or environment. The present invention has been implemented to generate C code for MS-Windows, Macintosh, OS/2 Presentation Manager, and UNIX (OpenLook and Motif). It has also been implemented to generate COBOL, PASCAL, and ADA.

The Inheritance Engine can change the class of an object according to its target environment, e.g., the target language and database. This ability allows the Generator to generate different code for different targets. For example, the specifications for a DataManager do not depend upon which database the Datamanager will eventually access. The generator sets the class of the object to the correct database type, and then generates code for Oracle, SQL Server, SQL Base, ODBC, etc. The code that is generated for one database is generally very different from the code generated for another database. The difference is not limited to differences in syntax. For example, the difference in the code may also be due to how error messages are received, e.g., callbacks or function calls. The Inheritance Engine can select the class which will provide the appropriate functionality for the object.

The language is fully extensible in two ways: adding Methods and adding Functions. Adding Methods to objects or classes increases the functionality of the object. Adding a Function actually extends the language, i.e., it adds capability to the language. Functions can be defined by both the Developer and the Modeler. Functions can be either External Functions or Internal Functions. External Functions cause external libraries to be linked into the program. Internal Functions actually generate code. Functions can be called from within any Method or Function.

Multiple Inheritance.

Multiple inheritance is implemented via Process Models, which allow a single object to inherit from several Process Models. An object can also inherit from the same Process Model more than once. Instance ID's are used to allow inheritance from the same object more than one time. Instance ID's are defined by the Knowledge Base on any Process Model that may be used several times on the same object. Instance Ids are used in the name of the Methods and Attribute Sets to uniquely identify them. FIG. 13A shows an example of using an Instance ID with the StartAWindow Process Model. The object "Customer Window" uses the same Method (Start!WinName!Window) twice. The Instance ID is used to uniquely identify the two Methods needed on the Effective Object to start one CustomerAddress window and one CustomerName Window.

The Inheritance Process.

FIG. 12 is an example of an inheritance process. The object "Customer List Box" inherits from the class (and object) "List Box." On the right side of the Figure, the Effective Object shows the effect of the inheritance and of changes made to the Customer List Box.

The List Box object, as a class, defines:
  An Attribute Set that indicates we need a Color, a Size, and a Location for the List Box;
  An Attribute Value of Blue for the Color attribute;
  Three Methods used by a List Box (Show, Selected and Unselected).

The Customer List Box object makes the following changes and additions:
  The Attribute Values for Location and Size are added;
  the Method (Selected) inherited from the List Box object is changed to the Method (Selected');
  The Method (No-Selection) is added.

The Effective Object is the result of the inheritance and the changes, as shown on the right-hand side of FIG. 12.

The purpose of the Inheritance Engine is to provide an accurate Effective Object, i.e., an object with a fully inherited view, to the Operator Interface and to the Generator. FIG. 12, described above, shows inheritance from a single class. FIG. 13 shows inheritance from a class and from a Process Model.

In FIG. 13, the same Customer List Box as in FIG. 12 is inheriting from the List Box object as a class. It is also inheriting from the Process Model Add Column Headers. The Customer List Box Object now adds Attribute Values for the Process Model's Attribute Set. The Effective Object shows that the Process Model's Method Show' has superseded the Method Show inherited from the object, and that the new Method ShowHeaders has been added.

This process works with any number of Process Models. If a Process Model is used several times with a single object, an Instance ID is assigned to each use of the Process Model. The Instance ID is used to rename Methods that would otherwise cause a "collision" of identically named Methods.

The Functions of the Inheritance Engine.

The primary functions of the Inheritance Engine are to:

Enforce precedence rules to ensure that components are inherited and overridden in the proper order. All components must be inherited and overridden in a consistent and defined manner. The order is as follows: (1) components directly attached to the object override all other components with the same name; (2) components inherited from Process Models override all other components with the same name, other than in (1); and (3) components inherited from the class.

Provide the information necessary to determine where individual components were inherited from.

Present a fully inherited Effective Object to other components of the system.

Provide the Generator with the ability to change the class of an object based upon the object's targeting. This will cause code to be generated differently for different targets. For example, the choice of the database a DataManager object will eventually access has no effect on the DataManager object during specification. The Generator will select the class most appropriate to the database type, and will generate code for Oracle, SQL Server, SQL Base, ODBC, etc. The code can differ substantially, depending upon which database is selected.

Provide the support needed to perform all needed Instance ID substitutions.

FIGS. 9A and 9B is a flow chart of the process used to create an object with a fully inherited view. The name of the process shown in FIGS. 9A and 9B is CreatInheritance Tree. This process creates, in memory, an inverted tree structure, called an Inheritance Tree, of the fully inherited object. This inverted tree structure is a commonly used structure in the field. The topmost, or first node of the tree is called the Root Node and is always the object of which the fully inherited view is being constructed. The process uses a Queue structure in memory, which is also a commonly used data structure. The Queue keeps track of each Subobject entered into the Queue and keeps the Subobjects in the order that they are entered.

The Generation Process.

Once the Inheritance Engine has been used to create an Effective Object, the generation process can begin. The Generator is an interpreter that reads the Specification, Design, and Generation Knowledge Bases, follows instructions, and generates source code. FIGS. 7A-7D are flow charts of the generation process (described in detail below).

The generator is driven by two separate and distinct languages: the Developer's language and the Modeler's language. FIG. 14 is an example of the Developer's language. The Developer's language is used by the Developer to specify the functionality that will be generated into the source code.

FIG. 15 is an example of the Modeler's language. A Modeler uses the Modeler's language to control the Generator. Using the Modeler's language, the Modeler instructs the Generator as to how to generate code for the application specified by the Developer in the Specification Knowledgebase, using the Developer's language. The Generator changes the class of an object, as instructed by the Knowledge Base and according to the specifications of the target, and instructs the Inheritance Engine to rebuild the Fully Inherited View of the object with information appropriate to the target specifications.

It is a goal of the present invention to provide an object-oriented code generation system whereby each object has a fully inherited view of the object.

It is another goal of the present invention to provide object-oriented techniques which greatly reduce the size of object lists.

It is another goal of the present invention to facilitate the re-use of objects.

These and other goals of the present invention are described in greater detail in the detailed description of the invention, the appended drawings and the attached claims.

The attached microfiche appendix contains the source code for the implementation of the present invention described herein.

BRIEF DESCRIPTIONS OF THE DRAWINGS

FIG. 14 is an example of the Developer's language.

FIG. 15 is an example of the Modeler's language.

FIG. 23 is a flowchart of an example of a define Method function.

FIG. 25 shows some sample object types and their corresponding classes.

DETAILED DESCRIPTION OF THE INVENTION

The present invention will be described with the aid of the flowcharts in the Figures.

Figure 1A:
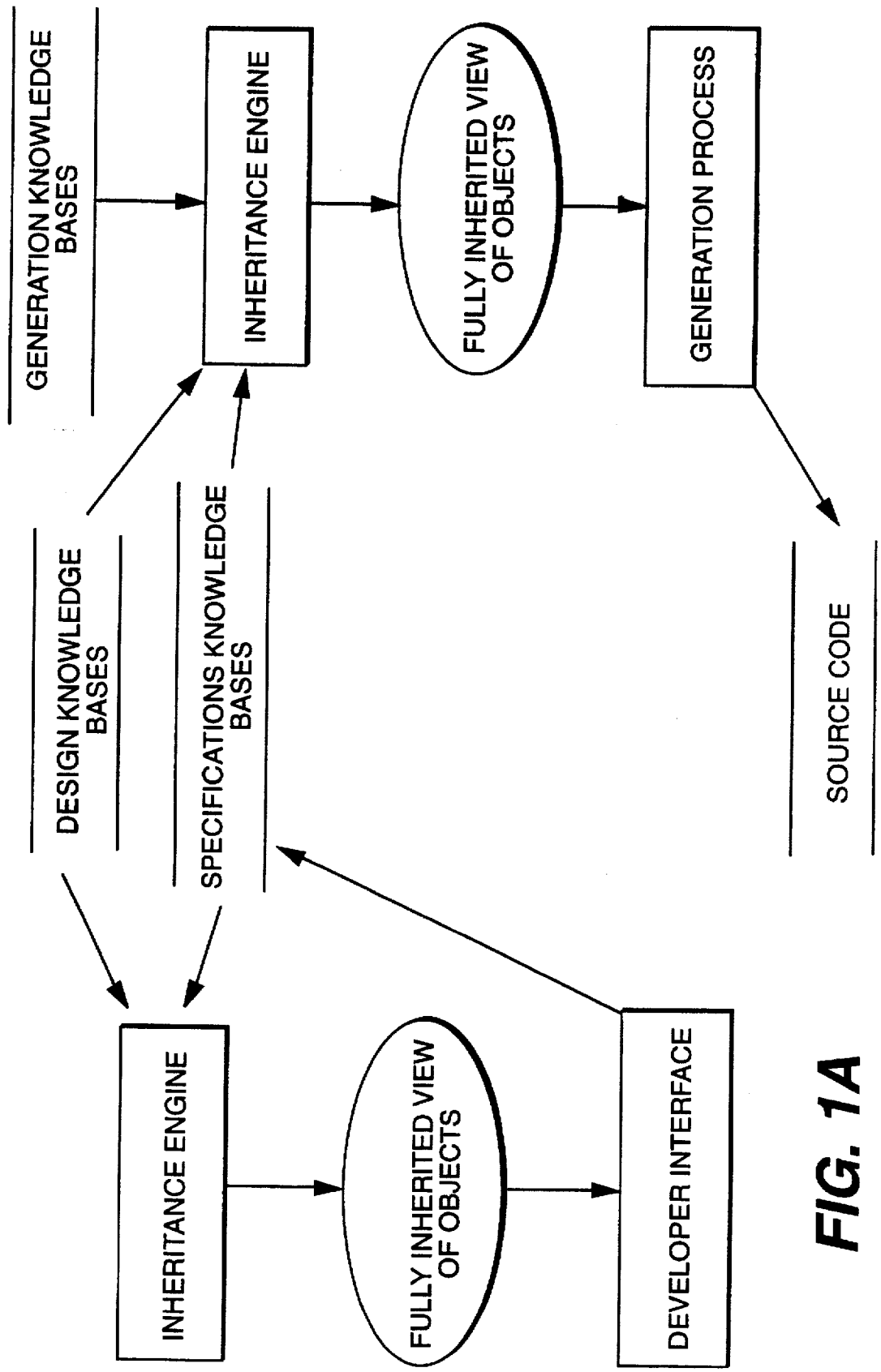
FIG. 1A is an overall view of the present invention, showing how the Inheritance Engine is used with the Operator Interface, the Generater, and the Knowledge Bases.
Figure 1B:
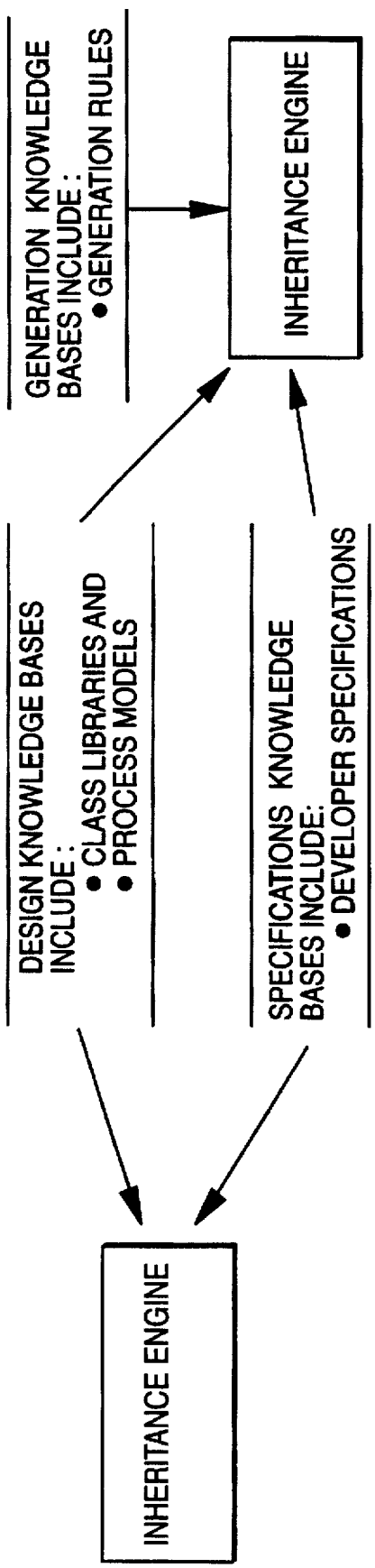
FIG. 1B shows the contents of the Design Knowledge Base, the Specifications Knowledge Base, and the Generation Knowledge Base.
Figure 1C:
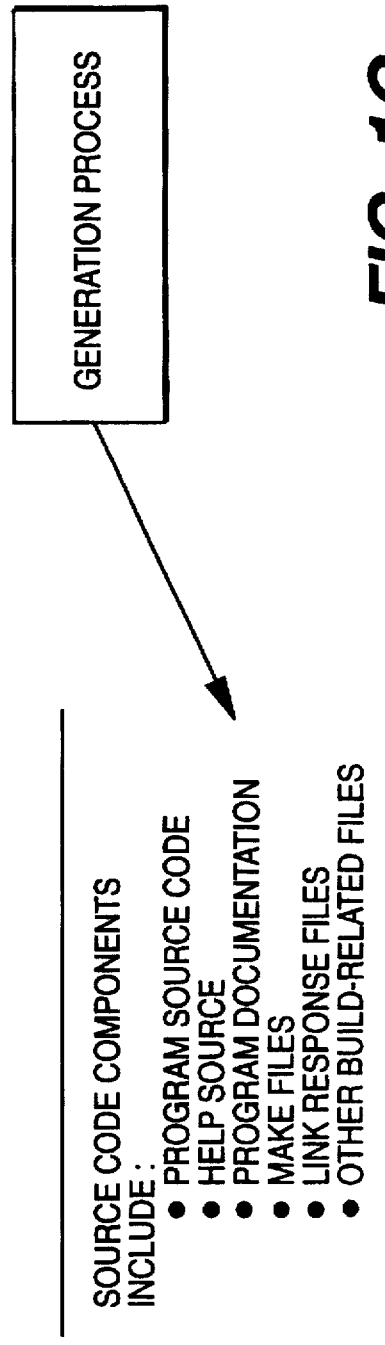
FIG. 1C is an overview of the source code components.
Figure 2:
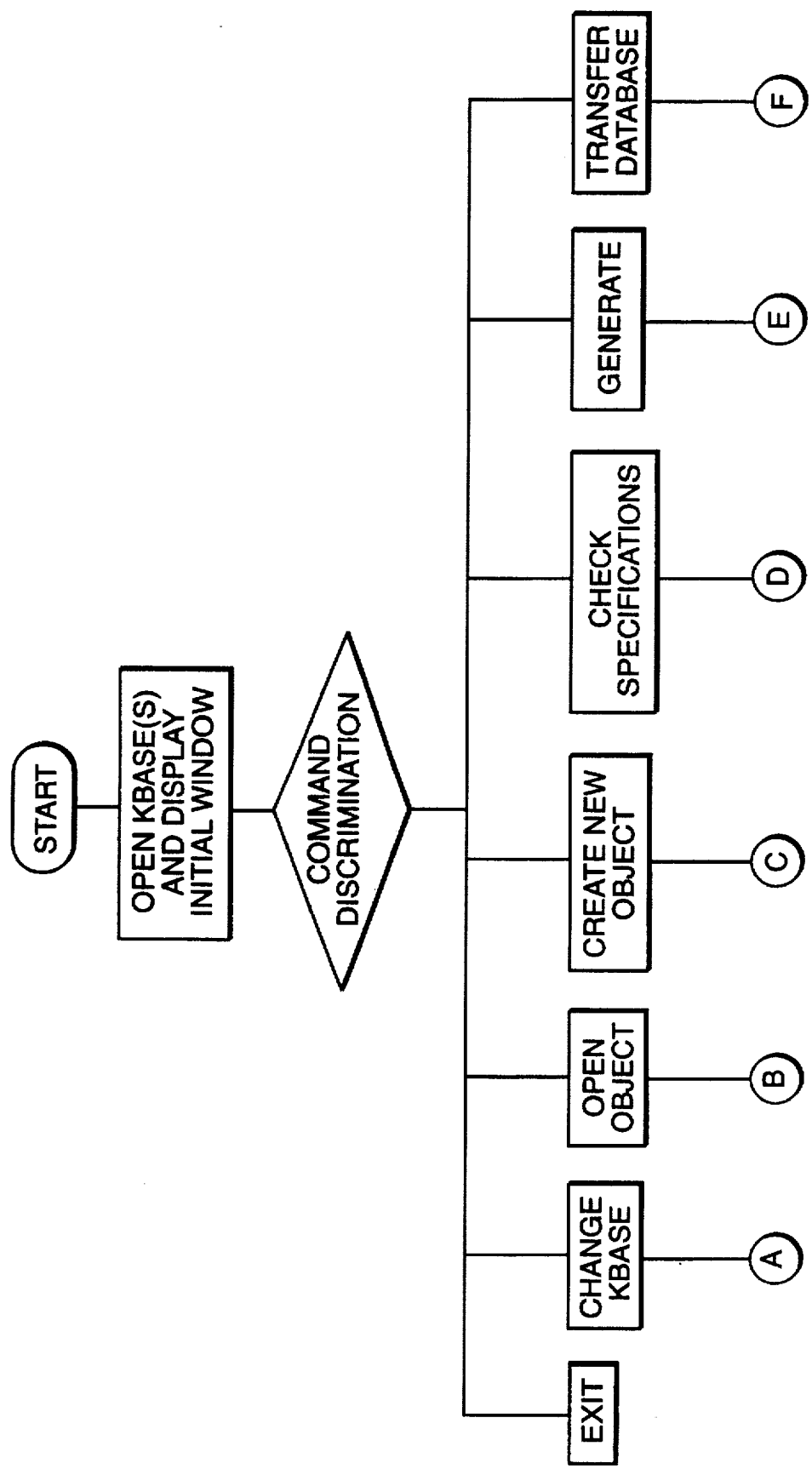
FIG. 2 is a flow chart of the major processes of the Operator Interface.

FIG. 2 is a flow chart of the Operator Interface. It shows that the Developer can use the interface to change the Knowledge Base (node A, FIG. 3), open an object (node B, FIG. 4), create a new object (node C, FIG. 5), check the specifications of the objects (node D, FIG. 6), generate code (node E, FIGS. 7A–7D) and to transfer a database (node F, FIG. 8).

Figure 3:
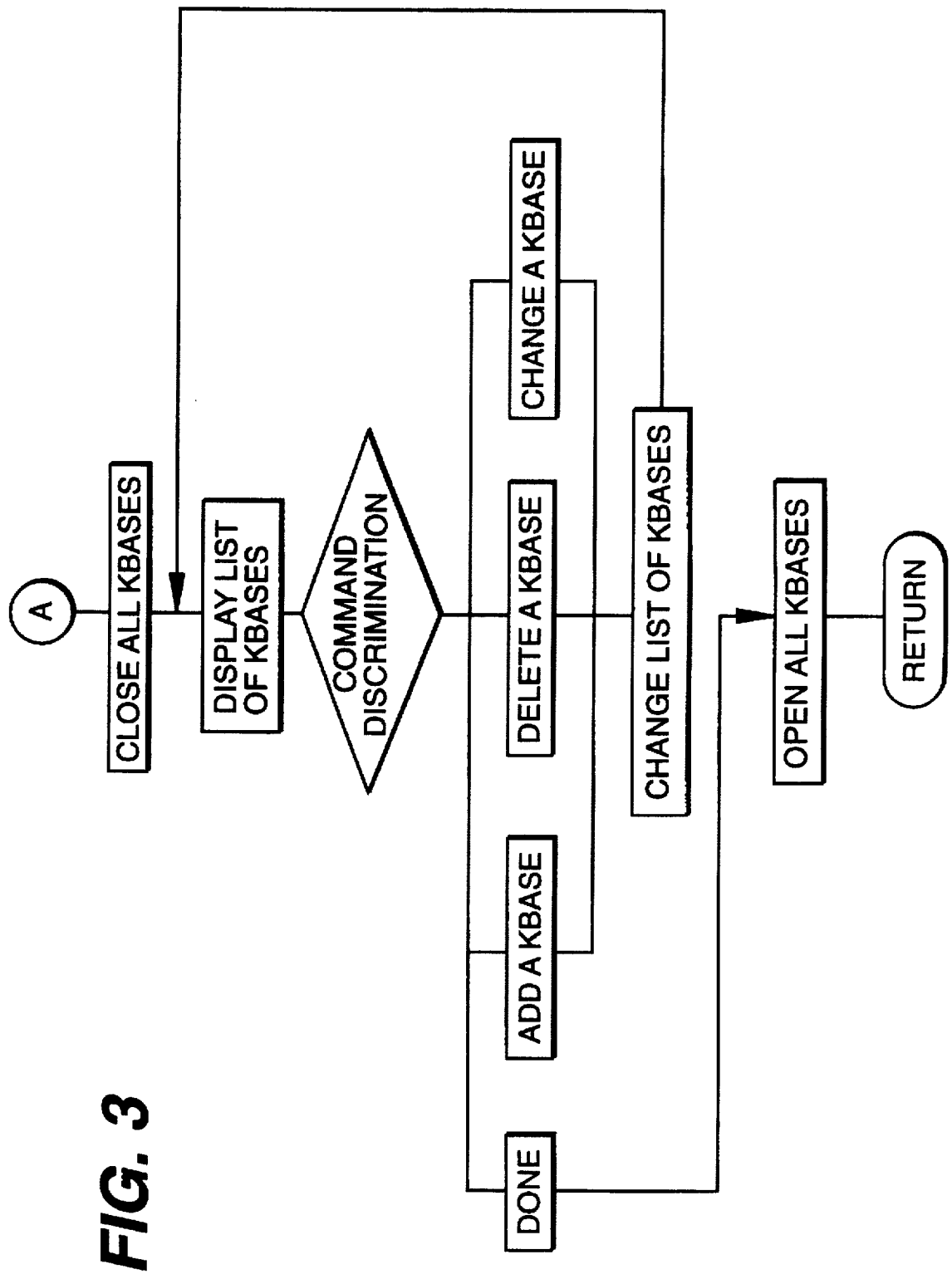
FIG. 3 is a flow chart of the process for changing the list of Knowledge Bases used.

FIG. 3 is a flow chart of the process used to change the list of Knowledge Bases. When multiple Knowledge Bases are used, they are logically concatenated to form a single, large concatenated Knowledge Base, as in the example shown in FIG. 16. When the Knowledge Bases are searched for an object, the Private Knowledge Base is searched first. Succeeding Knowledge Bases are then searched in order shown until the object is found. The Private Knowledge Base is used for all specification additions and changes. All other Knowledge Bases are designated as "Shared" and may be accessed by other members of a development group. When an object is opened from a Shared Knowledge Base, it is automatically registered as "Checked Out" in the source Shared Knowledge Base until the Developer "Checks In" the object. This structure provides a flexible means of supporting large development groups.

Figure 4:
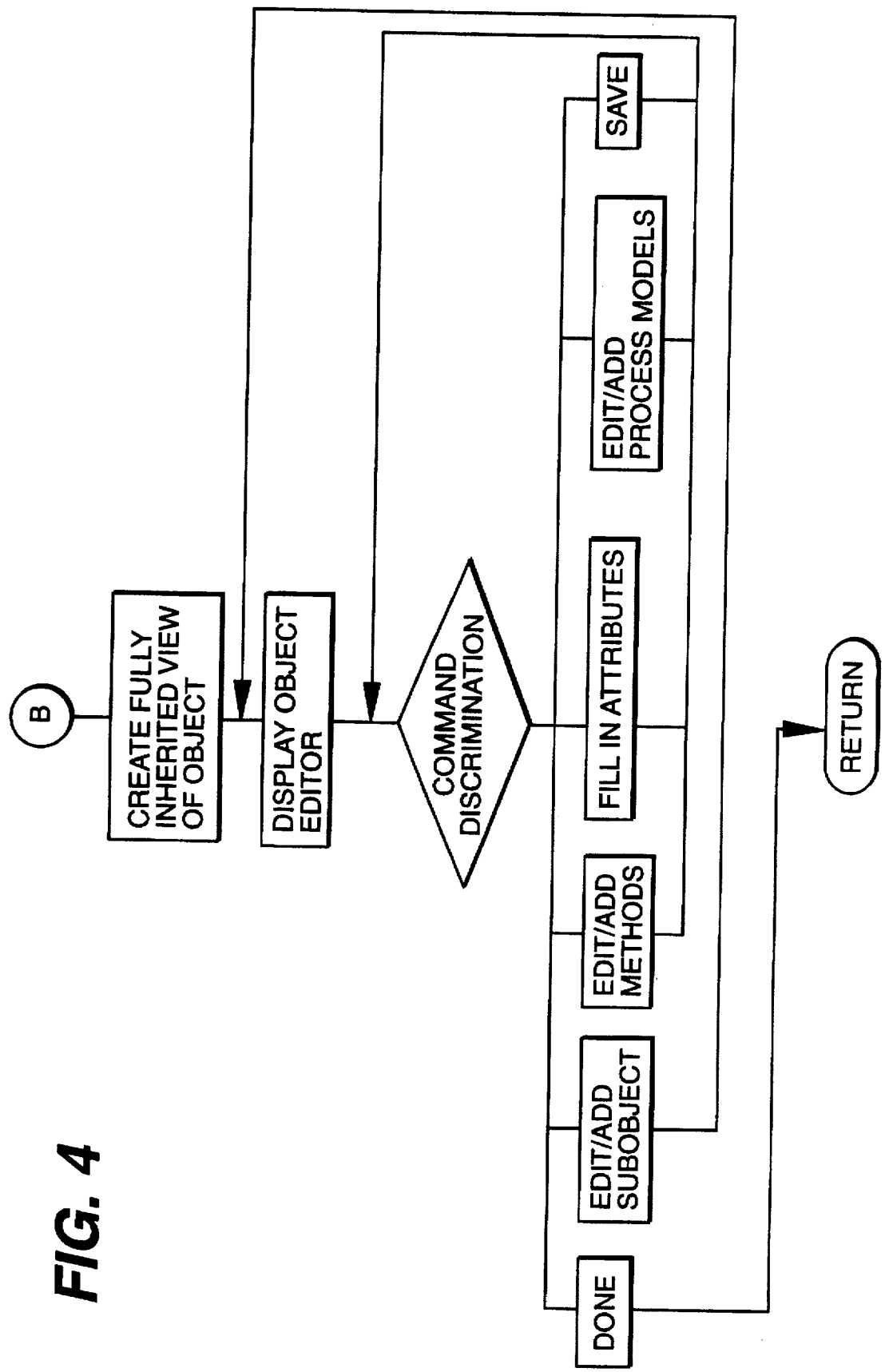
FIG. 4 is a flowchart showing how an object is opened so that components of the object, such as Sub-objects, Attribute Values, Process Models and Method, can be added, changed or deleted.

FIG. 4 shows the process of opening and editing an object. Editing an object entails adding, changing, and deleting components of objects (Sub-objects, Attribute Values, Process Models, and Methods). The results of this editing creates the Specifications used to generate source code. These components of objects are discussed below.

Figure 5:
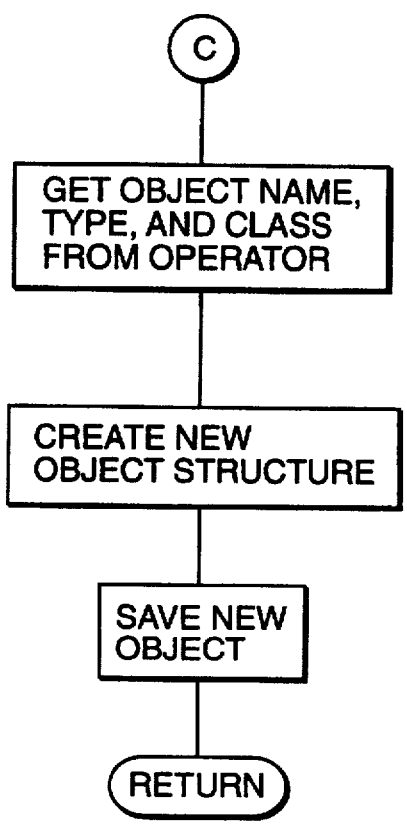
FIG. 5 is a flow chart of the process used to create a new object.

FIG. 5 shows the process for creating a new object. A new object is created by specifying the type of an object (Window, Widget, Business, Program, View, DataManager, DataStore, Data, etc.), the class of the object (where to inherit characteristics from), and the name of the object. Names must be unique within the type of the object. The choice of an object type also limits the number of possible classes for the object. FIG. 25 is a list of example object types and valid classes for those types. When a new object is created, the Operator Interface automatically allows the new object to be edited.

Figure 6:
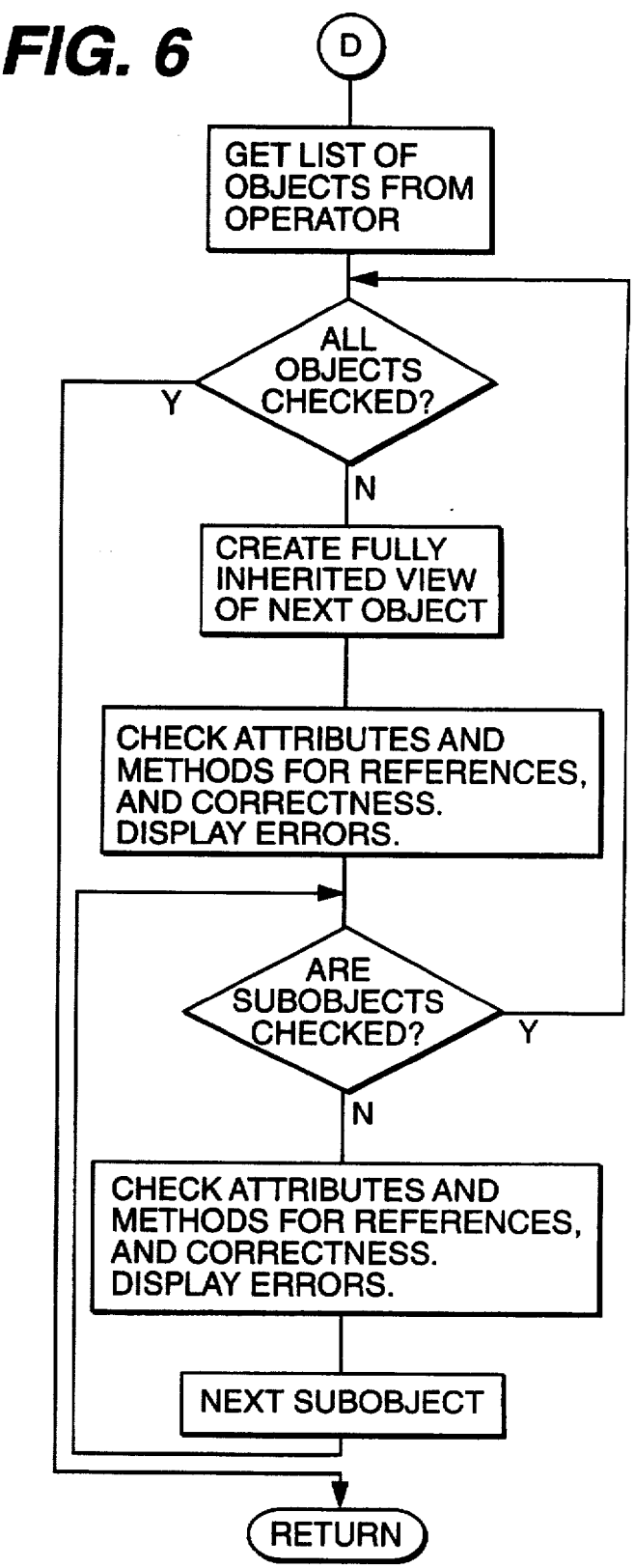
FIG. 6 is a flowchart of the process used to check the integrity of the Developer's specifications.

FIG. 6 shows the process for checking the integrity of the Developer's specifications. This process consists of:

reviewing Methods for proper syntax and legitimate object references;

reviewing Attribute Values for legitimate values, existing Required values, and legitimate object references; and other validations, as defined by the Knowledge Base.

Object references are deemed legitimate if (a) the object exists, (b) all Methods referred to exist (see discussion below with reference to FIG. 10 on finding a reference), and (c) the "Scope" of the object and/or Methods is appropriate for the reference. The "Scope" of an object determines how it can be used. Scope may be Self, Owner, Root, or Global. A scope of Self means that the object may only be referenced by the object itself or one of its Subobjects. A scope of Owner means that the object may be referenced as defined by Self as well as by the object that owns the referenced object. A scope of Root means that it may be referenced as defined by Owner and by any object that owns the referenced object, up through the Root object (Window, Business, DataManager, or Program). A scope of Global means that any other object may reference the object.

Figure 7B:
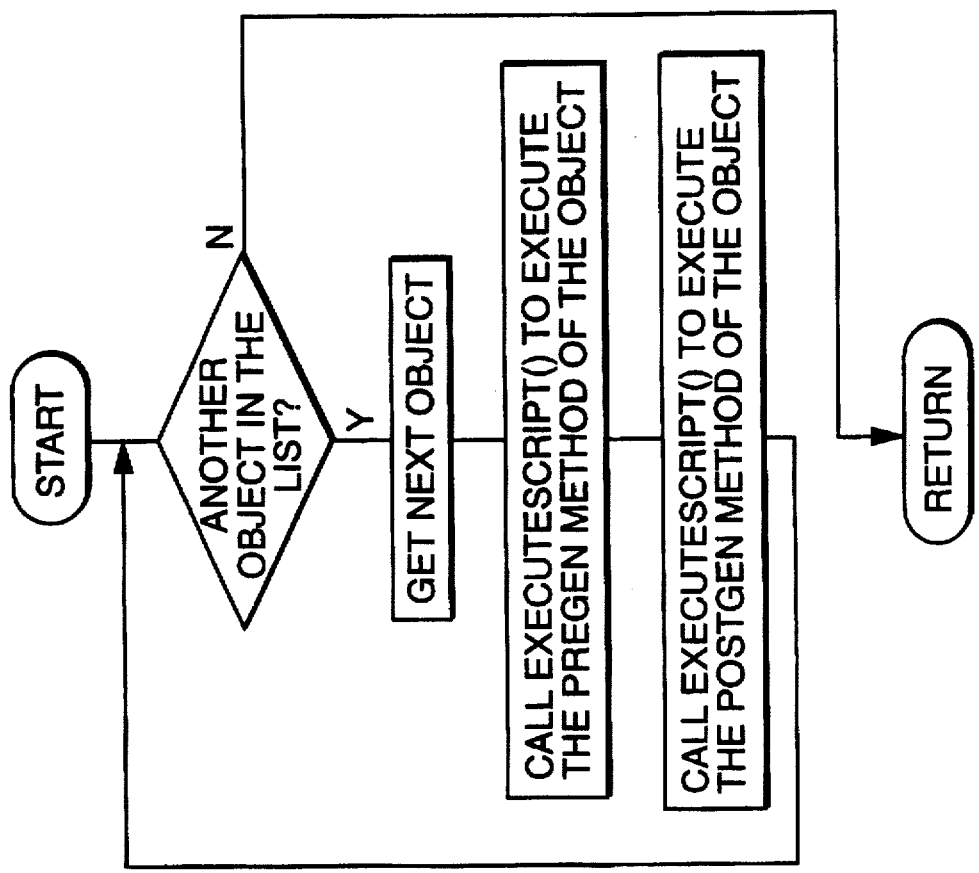
FIGS. 7A-7D are flowcharts showing the process used to generate code.
Figure 7A:
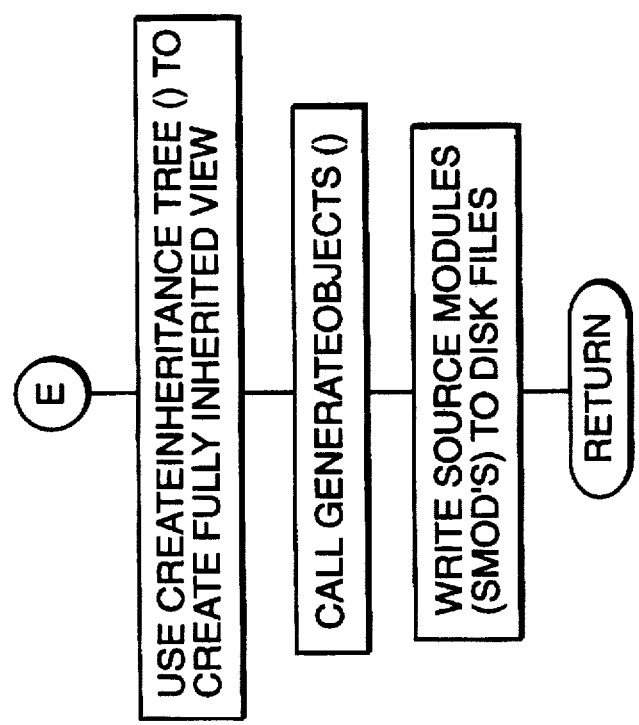

FIGS. 7A–7D show the generation process. The generation process is described in more detail below. FIG. 7A shows the overall generation process. The Generation process is started by creating a Fully Inherited View of the object to be generated. The Generator invokes the GenerateObjects function to generate code. Code is generated by creating a number of Intermediate Modules (IMODs), each containing source code and collating instructions. The generator follows the collating instructions to actually write the code to source code files.

FIG. 7B shows the GenerateObjects function. Every generatable object contains a preGen and a postGen Method. Source code is generated by calling the function ExecuteScript for the preGen Method, then calling ExecuteScript for the postGen Method. ExecuteScript will perform the actual interpretation and generation of source code. GenerateObjects is performed for each object in the object list.

Figure 7C:
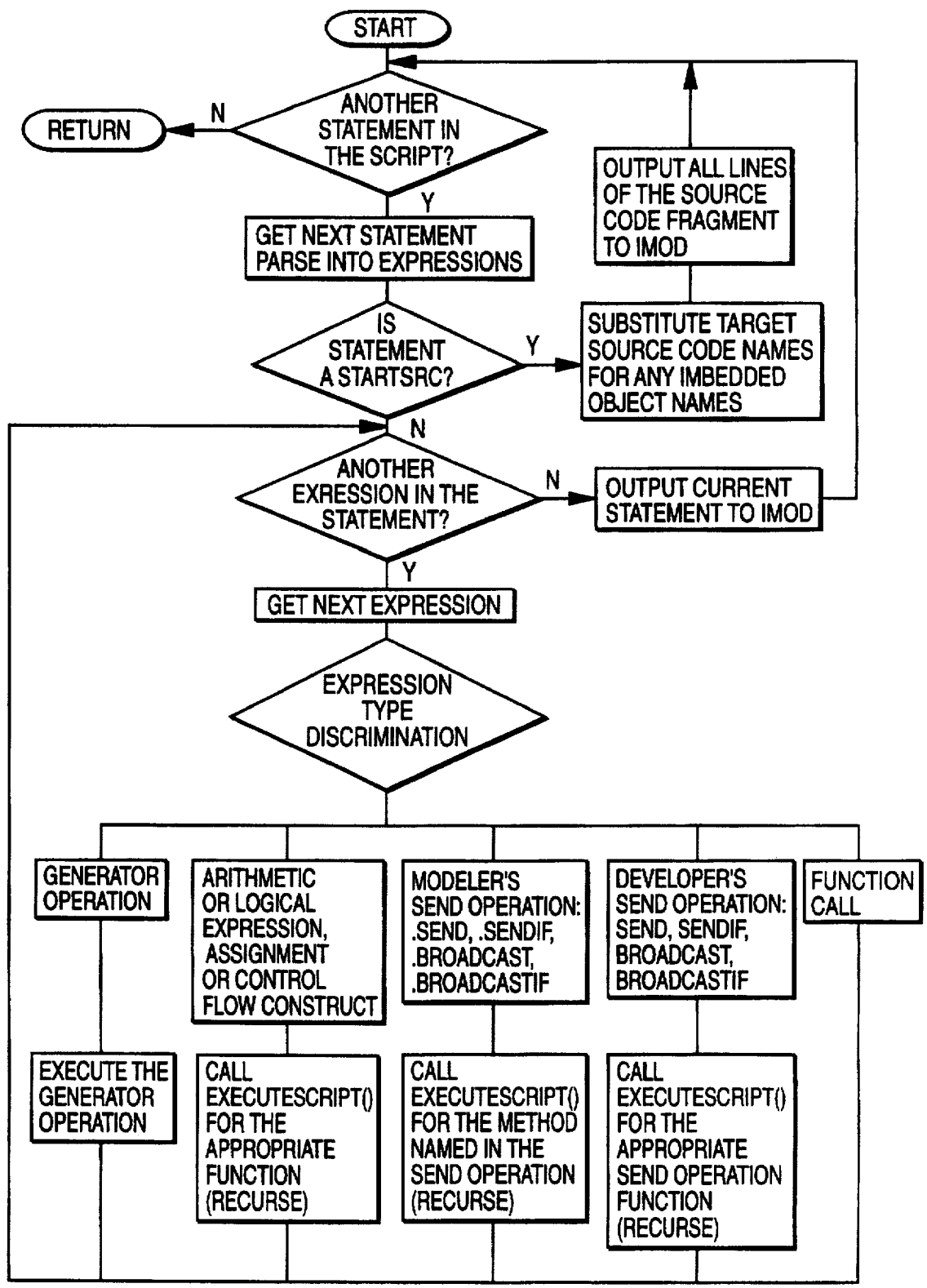

FIG. 7C shows the ExecuteScript function. Every Method contains a Script, which consists of a series of Statements, which, in turn are parsed into one or more expressions, as defined by the Language Definition section.

If the statement is "StartSrc," then the lines following the statement are a source code fragment. The present invention allows the Developer to include a source code fragment within any script. The source code fragment is then produced by the generator as it is written by the Developer. However, any references to objects are first translated so that the generated source code contains references to the proper data names in the generated application. The source code fragment is then placed in the current IMOD.

If the Statement is not StartSrc, it is made up of one or more expressions. As each expression is processed, the Generator performs specific operations, as defined below. Each operation may add to a working string of generated code. When all of the expressions of a Statement have been processed, the working string of generated code is written into the current IMOD.

Each expression falls into one of the following categories:

Generator Operations. Generator Operations are explicit instructions to the Generator. These are primarily string operation and module operation functions. They are Modeler's Language expressions. Generator Operations are described in the Language Definition section.

Arithmetic, Logical, Assignment or Flow Control Expressions. These expressions are implemented in Script (discussed in more detail below). They include basic arithmetic and logical expressions, assignments, and flow control expressions. These expressions may be written in either the Developer's Language or the Modeler's Language, and are defined in the Language Definition section. These functions are described in more detail below.

Modeler's Send Operations. Modeler's Send operations are Send operations written in the Modeler's Language. These include:

.send;

.sendIf;

.broadcast; and

.broadcastIf.

These Send operations cause the named Method to be executed by the Generator. Note that the difference between these send Methods and the Developer's Send Methods is that these operations execute the send Method, while the Developer's Send Methods (described below) use the Method's genSend Method to create a reference to the Method.

Figure 7D:
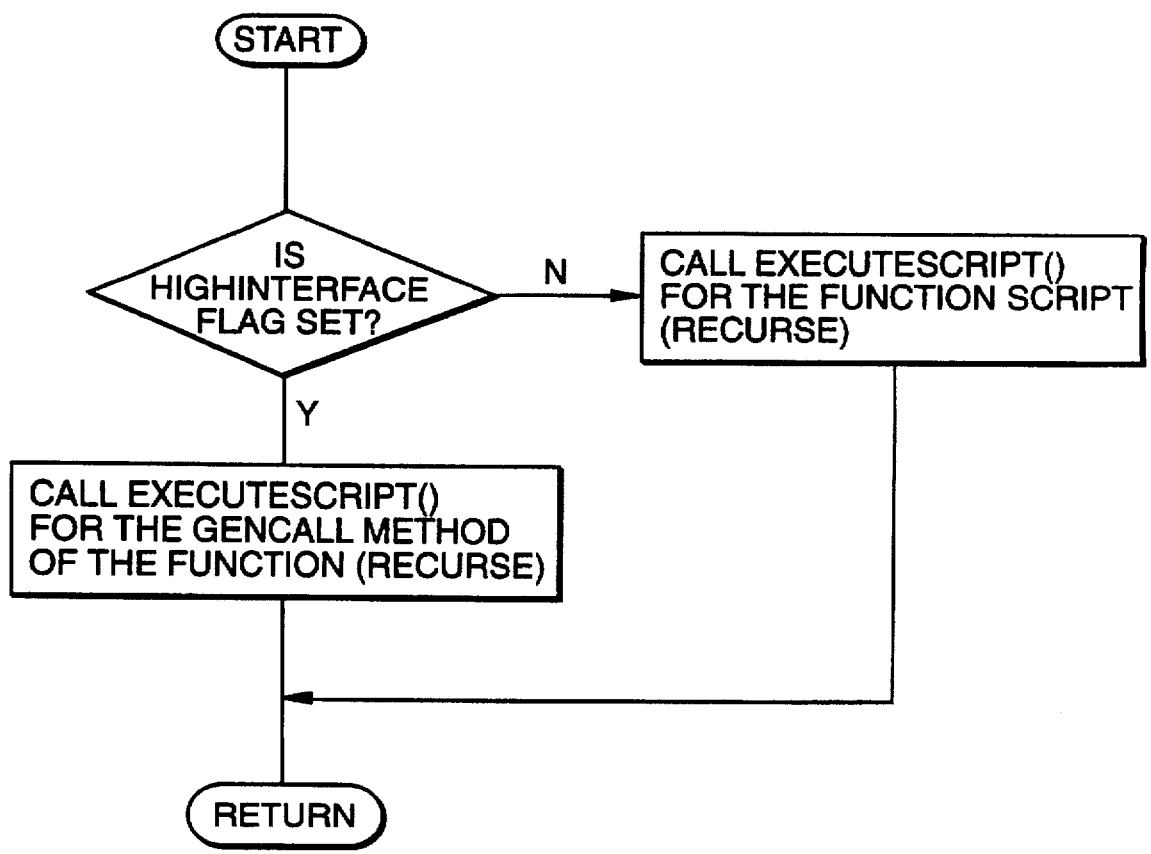

Function Calls. As shown in FIG. 7D, when the Generator encounters a Function call, it causes either the Function to be executed or the genCall Method of the Function to be executed, depending upon the state of the High Interface Flag stored with the Function. Function calls are described in greater detail below.

Developer's Send Operations. Developer's Send operations are written in the Developer's Language. The Developer's Send operations include Send, SendIf, Broadcast, and BroadcastIf. Each of these functions are in the Knowledge Base that directs the generator to reference to the Method. As implemented, the Send operation is translated into one of the following code references:

Inline Class Methods. Inline class Methods generate the Method itself, instead of the genSend. This places the generated code in the current function.

genSend. genSend generates a function call to the target Method, using the function name that will be used when the Method is generated. genSend may use the native windowing environment's Notification capability to send a Notification instead of a function call. In this case, genSend will build up a string that sends the proper notification.

If the Method is targeted as an RPC, genSend will build up the necessary source code statements.

These different options are driven by the Method target, as interpreted by its genSend Method. The Generator generates the proper source code, as it executes the genSend Method.

In addition to the four common Methods "genSend," "genCall," "preGen" and "postGen" discussed above, the present invention uses a fifth common Method, "define." Define causes the generator to generate the actual code for implementing the method. Define is invoked by typical preGen Methods. preGen and postGen exist as Methods on generatable objects. genSend and define exist on Methods. genCall is similar to genSend, but exists on Functions. These Methods are often identical for similar objects and Methods. These Methods are usually inherited from the object's class or from Process Models attached to the Methods.

Figure 8:
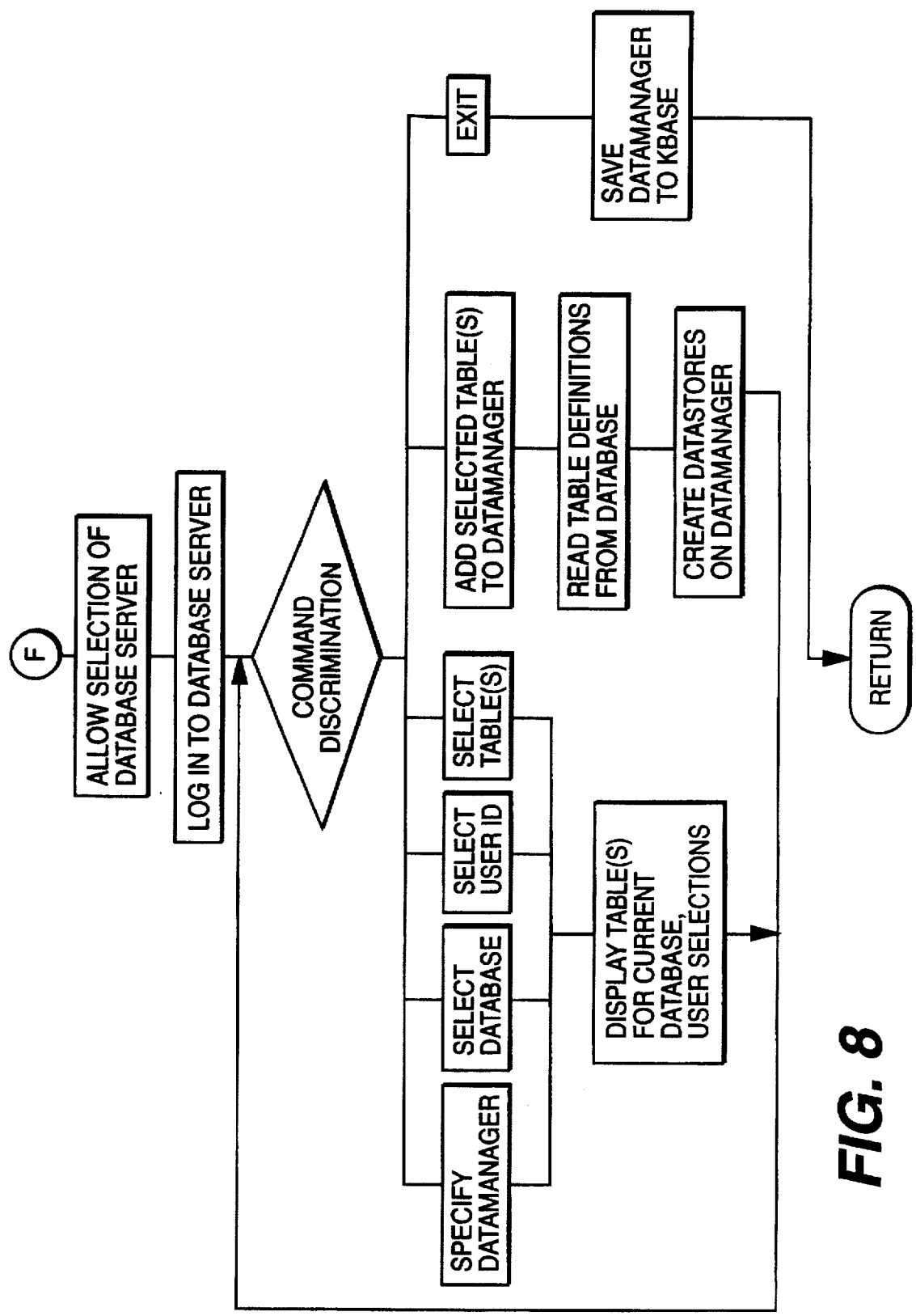
FIG. 8 is a flowchart showing the process used to transfer data from an existing database into a DataManager.

FIG. 8 is a flowchart of the process for the Transfer Database function. Transfer Database reads the information from an existing database and transfers this information into a new or existing DataManager. The DataManager may then be used by any other object. The process gathers information about the tables to be transferred from the Developer. Before anything can be done with database, the Developer must identify which database server to use and must log onto the server as a valid user. The Developer then chooses an existing DataManager or types in a new name for a Data-Manager (in which case, a new DataManager is created in memory). The steps following this step depend upon the vendor of the database server being used.

Most database server vendors support table names that consist of a user id, a period ("."), and the table name. For example, "userid.Customer" may be a valid Table name. Some vendors, however, segment a server into "databases", and prefix the table name with the database name. In this case, "Training.userid.Customer" would be a valid table name. If the vendor of the database server selected by the Developer supports a Database, a list of valid databases is displayed for the Developer to choose from. A list of valid user id's is displayed for all databases and includes the choice "All Users". Once a user id (and database, if available) is chosen, all the available tables that match the user id (and database) are listed. The Developer may then choose any number of tables, and add the table description to the DataManager. When the Developer chooses the Exit function, all of the DataManager is saved to disk in the private Knowledge Base.

Figure 9A:
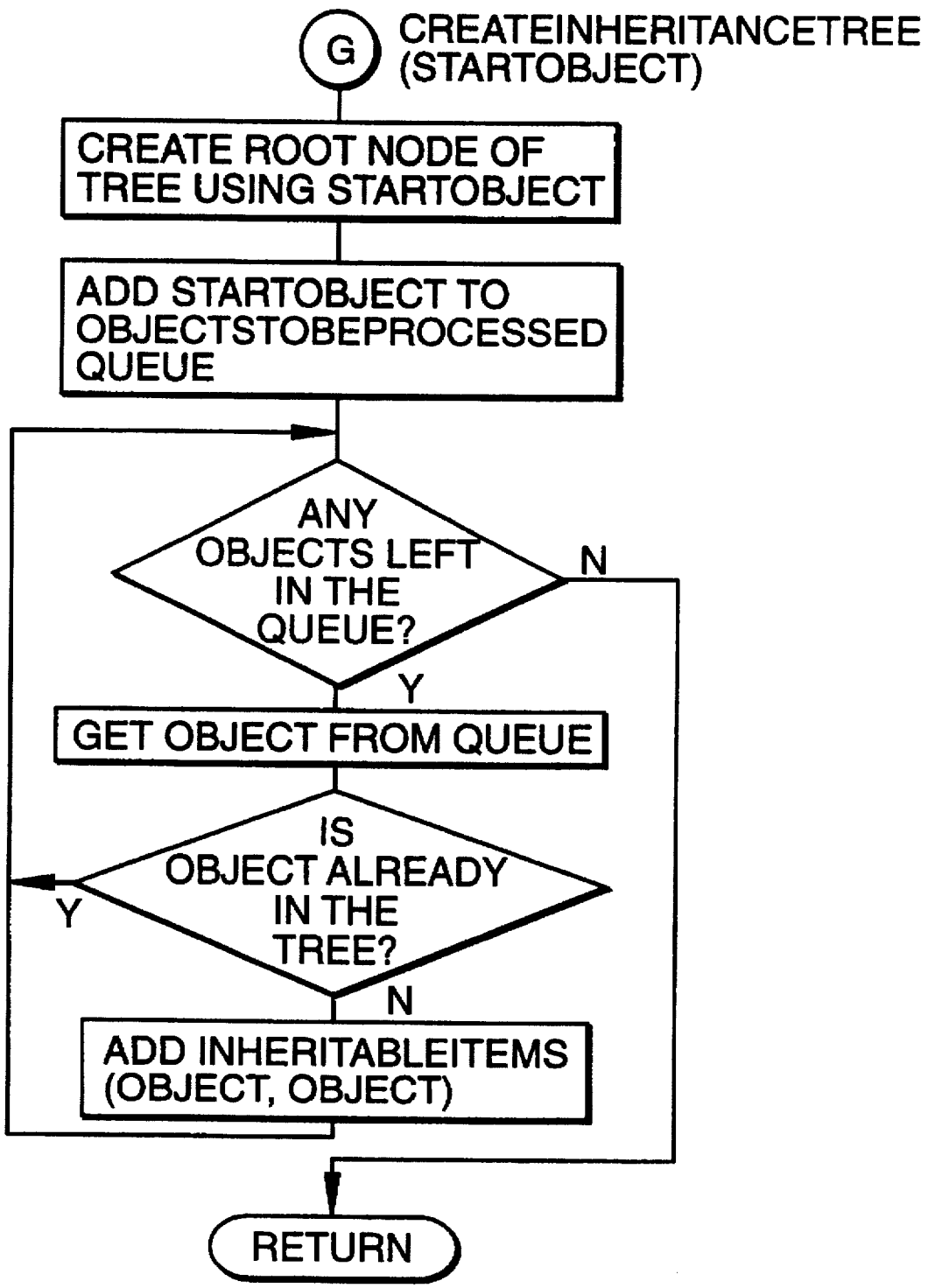
FIGS. 9A and 9B is a flowchart showing how an Effective Object with a fully inherited view of the object is created.
Figure 9B:
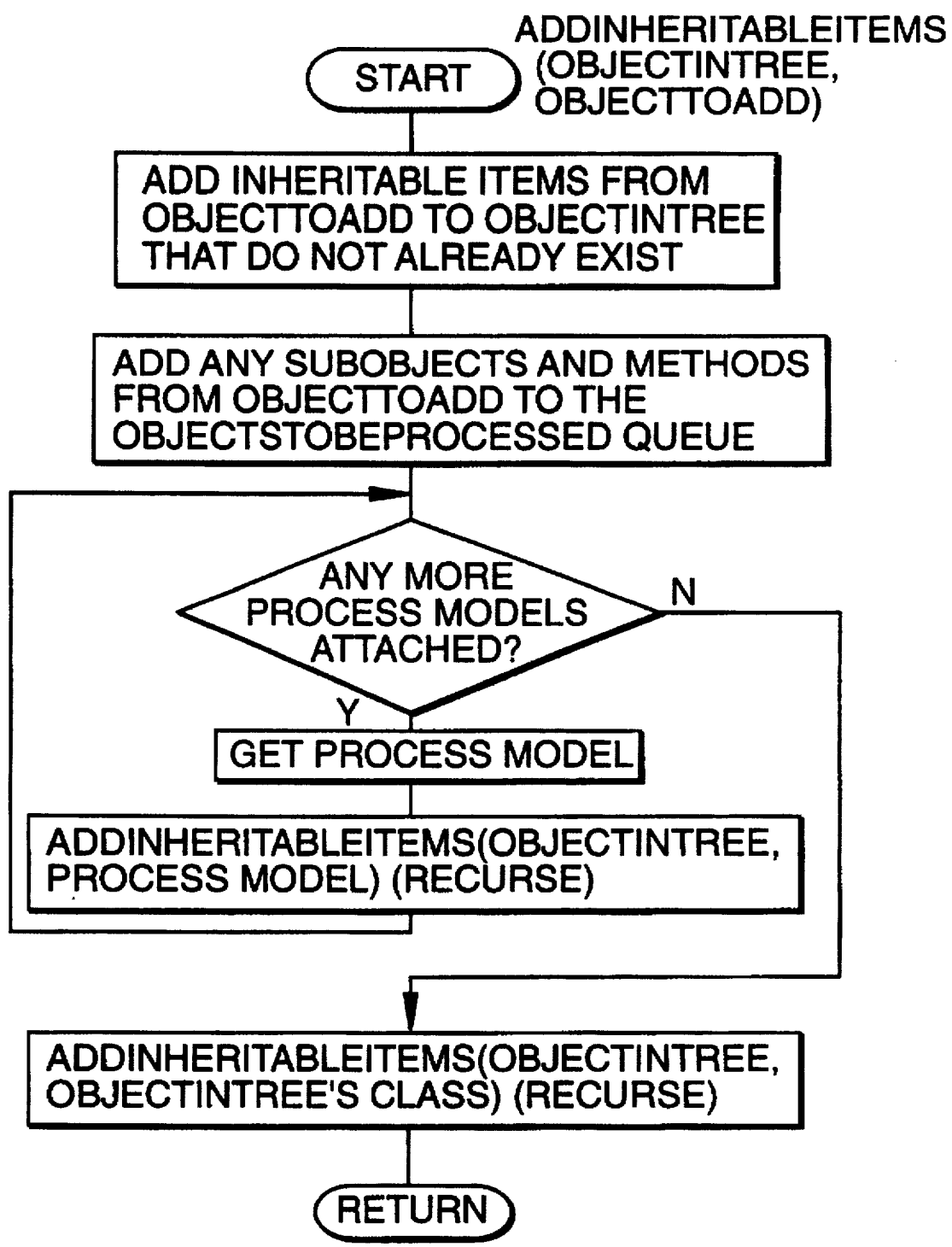
Figure 12:
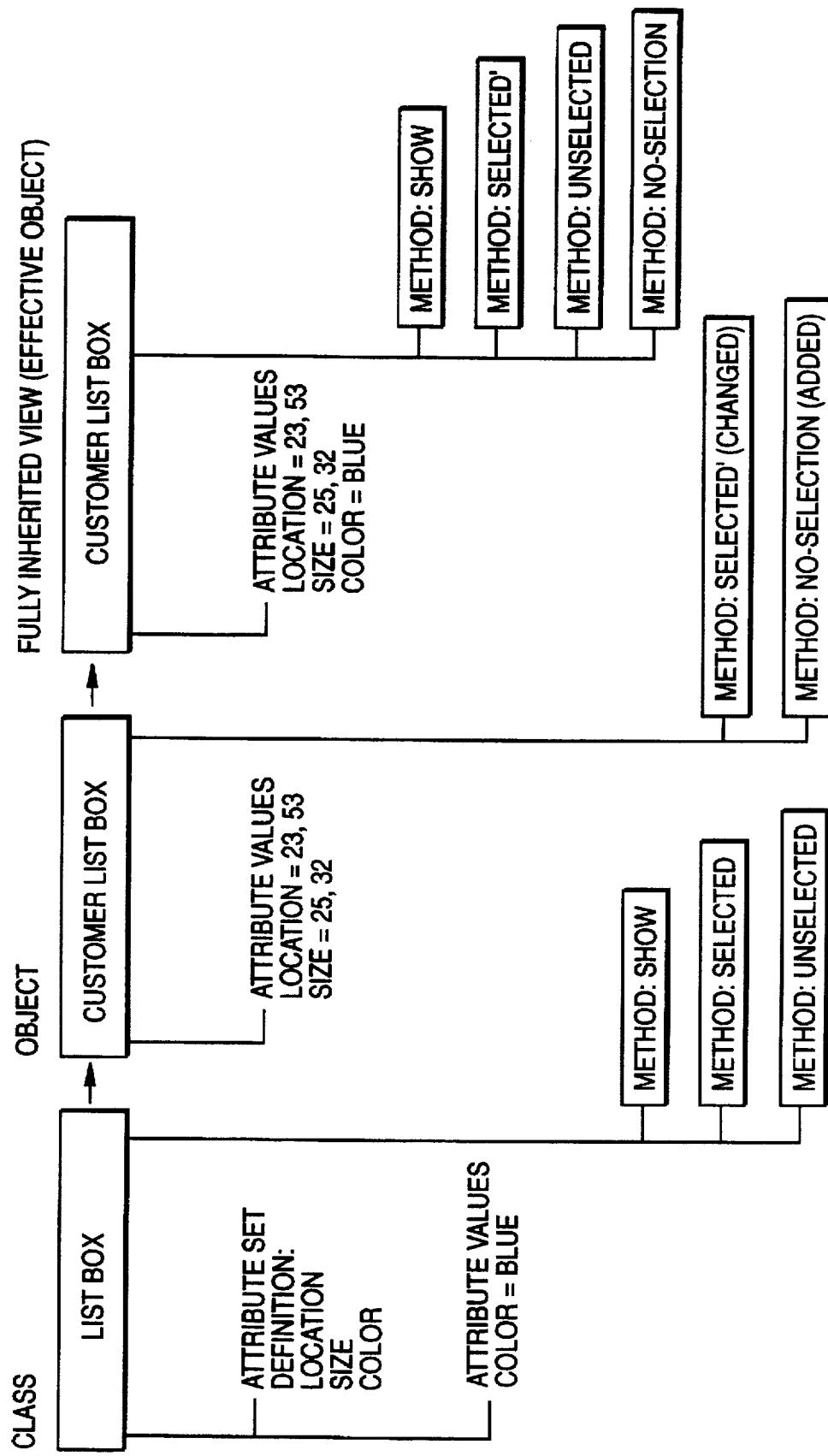
FIG. 12 is a model of an object inheriting attributes from a class.

FIGS. 9A and 9B is a flowchart of the process used to create a fully inherited view of an object. The fully inherited view is a vital part of the invention that shows any opened object as an "Effective Object". FIGS. 12 and 13 show examples of Effective Objects. The fully inherited view of the object is displayed by the Operator Interface and used by the Developer to create specifications. It is also used by the Generator to assemble all of the components of an object for source code generation. In addition, the Generator uses the fully inherited view to generate the appropriate code for different targets. The Generator may, based upon the target of an object, change the class of the object at generation time. The process is then invoked to create a fully inherited view of the object with the new class. This allows different code to be generated for different targets. For example, a DataManager may generate very different code for Oracle and for Sybase's SQL Server.

The use of the fully inherited view of an object is useful to the Developer, because it eliminates the need to fully understand the object class hierarchies that the object is inheriting from. With the full capabilities of the object easily seen, the Developer can readily reuse existing objects.

CreateInheritanceTree is used to create the Fully Inherited View, with a starting object as a parameter. CreateInheritanceTree creates a tree data structure, with the starting object as the root node. CreateInheritanceTree uses the function AddInheritableItems, which takes two parameters: the object that is in the tree and the object to inherit from. Together, these functions recursively add any inheritable items from Process Models and classes. These functions work recursively in order to support multiple levels of inheritance and to support the inheritance of Subobjects, which, in turn, inherit from other classes and Process Models.

Multiple levels of inheritance occur when, for example, an object inherits from a class, which inherits from a class and Process Models, each of which may inherit from classes and Process Models. At each class and Process Model, the Object may inherit Attribute Set Definitions, Attribute Values, other Process Models, Subobjects (including Methods).

When a Subobject is inherited, it has all of the characteristics of an object, so it will inherit from a class and may have Process Models, Attribute Set Definitions, Attribute Values, and Subobjects (including Methods). Methods are treated as Subobjects, i.e., Methods have a class and may have Attribute Set definitions, Attribute Values, Process Models, and Subobjects. Method Subobjects include Parameter, Work and Return data objects, Methods, and Scripts. Methods use Methods as Subobjects to support code generation.

Figure 10:
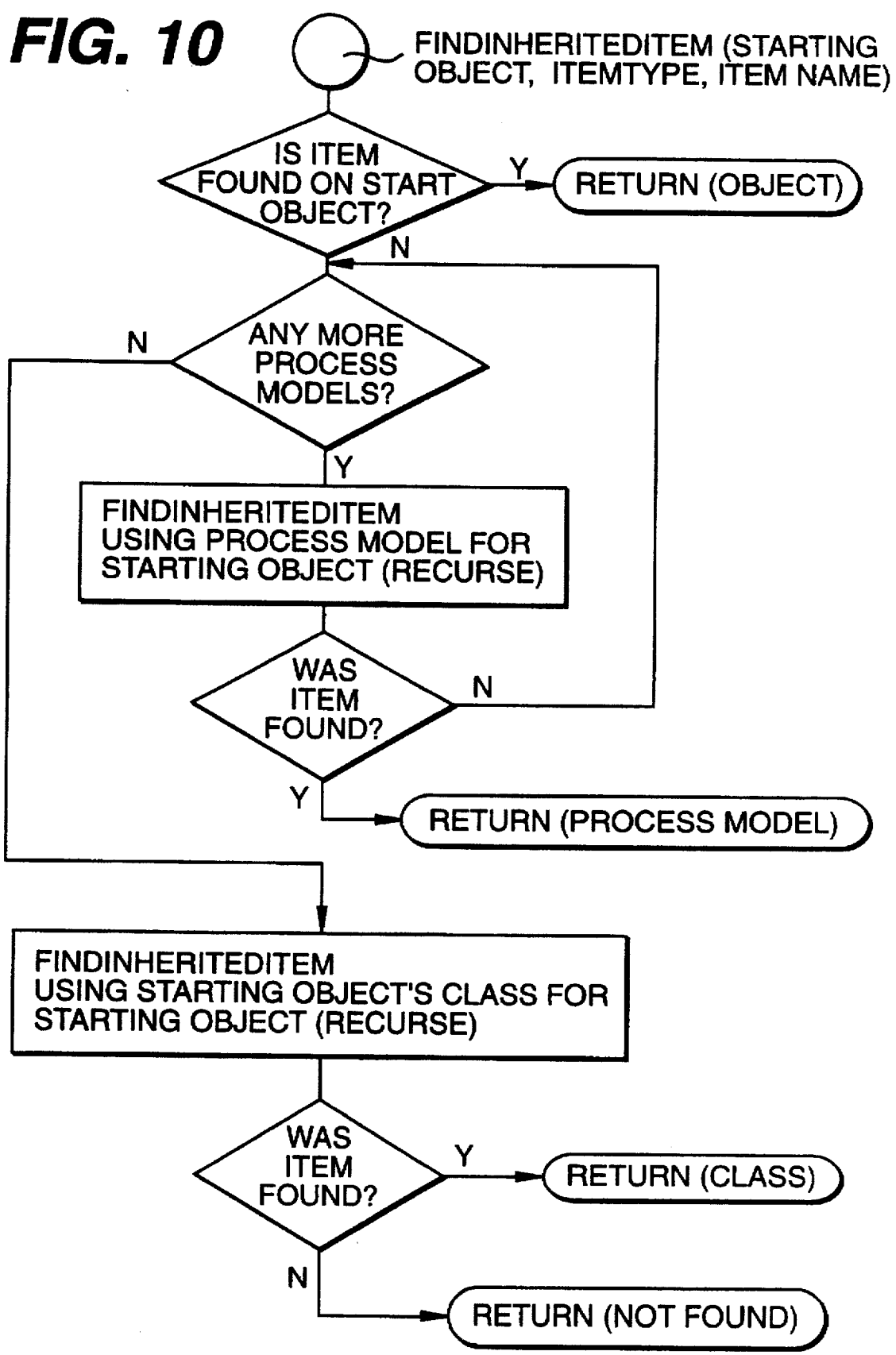
FIG. 10 is a flowchart of the process used to develop a fully inherited view of objects which include other objects which themselves do not have a fully inherited view.

FIG. 10 shows the FindInheritedItem process. This process is used by the Generator to resolve references to Methods and other objects. A fully inherited view is used for the object being generated. The FindInheritedItem is used for references to other objects, which do not have a fully inherited view constructed at generation time. This process examines the current object, then recursively searches the attached Process Models and the classes and Process Models that the Process Models inherited from prior to searching the object's class and the classes and Process models that the object's class inherits from. This process is performed in this way to exactly match the fully inherited view of the referenced object.

Figure 11:
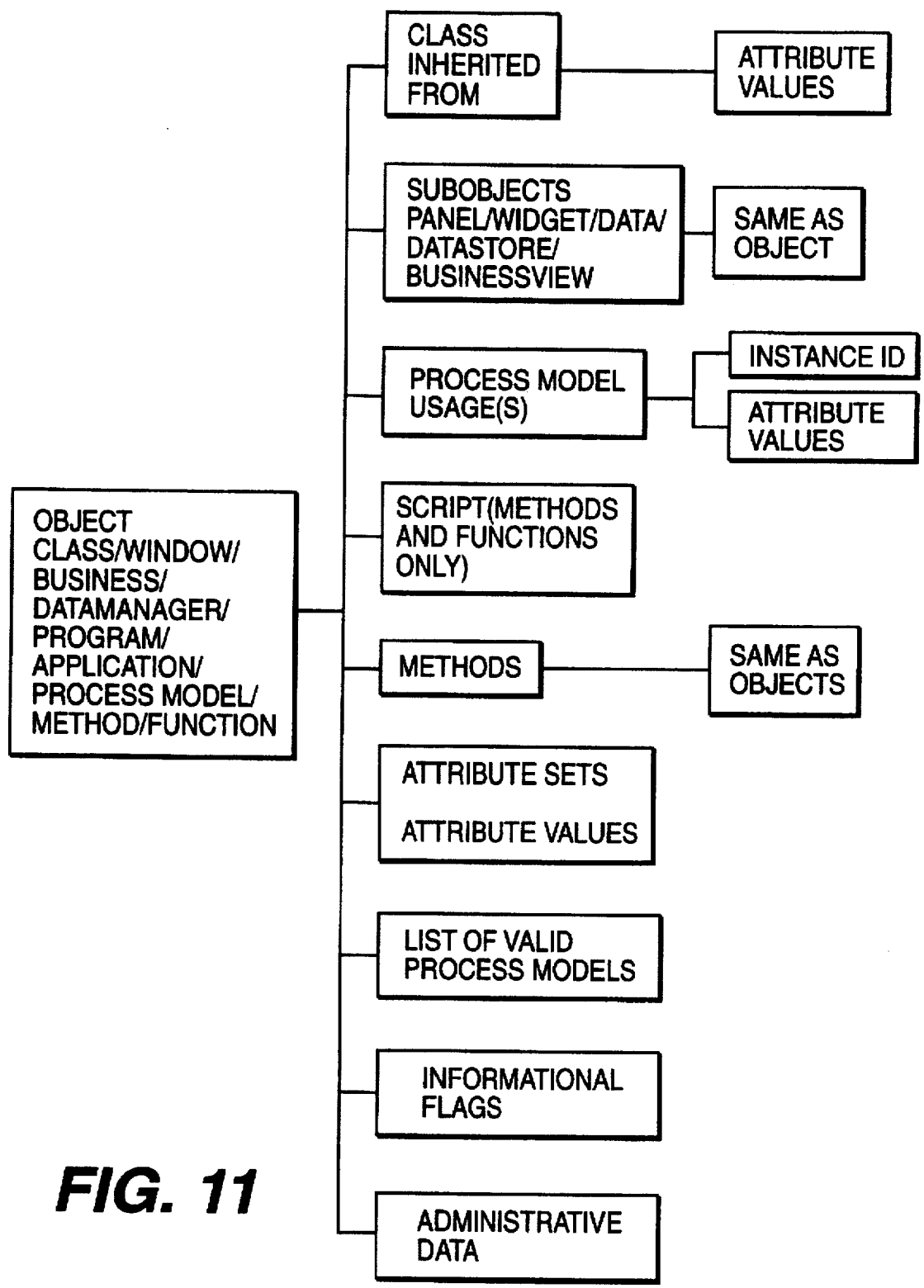
FIG. 11 is a model of an object.

FIG. 11 shows a model of an object. Everything is an object, including Methods, Process Models, Functions, and classes. All are objects, with similar data structures. FIG. 11 shows that several sets of Attribute Values may be retained with an object: Attribute Values that satisfy a class's Attribute Set Definition, Attribute Values that satisfy each Process Model's Attribute Set Definition, and Attribute Values that satisfy the Attribute Sets defined for the object itself. The Attribute Set Definitions are inherited from the class and Process Models. If a single Process Model is attached more than once to the same object, it will require an Instance Id to identify the different instances of the Process Model attached to the object. FIG. 11 shows that an (optional) Instance Id and Attribute Values are stored with each reference to a Process Model.

Methods and Functions are the only objects that have a Script attached. Otherwise, they are identical to other objects (even to the point that they can contain Methods, Subobjects, and Attributes). Each object contains a list of valid Process Models to help the Developer choose process models during the specification process. Each object also has a set of Informational Flags that provide information such as: the object is/is not generatable, the object can/cannot be seen by a Developer, the object can/cannot be seen by a modeler, the object has been changed since it was generated, etc. Each Function also has a Flag to indicate that whether it is/is not a High Interface Function. A High Interface Function operates similar to a Developer's Send operation, causing the genCall Method of the Function to be executed, usually by generating a function call in the generated code. Otherwise, the Function Script will be executed when referenced.

The object also contains a number of basic administrative data. These include the Name of the object and the Short Name of the object, the date and time it was created and modified, who created and last modified the object, description, Help text and Title, etc. Of these, the object Name and Shortname, descriptions, and Help Text and Title are relevant to the generation process. The object's Name and type uniquely identifies the object. The object's Shortname is used to name objects and functions in generated code and during the generation process.

The Help Text and Tile are used to generate Help files, used by the target operating system to provide Help. These files are produced by the Generator, as directed by the Knowledge Base, just as source code is.

Descriptions are used to direct the Developer and to document the work performed.

This object structure is stored on disk in the Knowledge Bases. In Memory, a similar structure is stored, with all of the inherited objects included in the structure.

FIG. 12 shows an example of inheritance that creates an Effective Object. This Effective Object is the view that is created for a Fully Inherited View of an object. The class that is being inherited from is an object with the name ListBox. It has an Attribute set that defines Location, Size, and Color as Attributes of a ListBox. It has an Attribute Value that defines the color Blue as a default value for the Color attribute. The ListBox object has three Methods: Show, Selected, and Unselected. These Methods define how the ListBox acts.

The Object CustomerListBox is the object that is defined as part of a specification. It identifies ListBox as its class, adds Attribute Values for Location, and Color, adds a Method called No-Selection and modifies the Selected Method from ListBox, creating a Selected' Method. These new Methods modify the actions of the CustomerListBox Object. CustomerListBox will act exactly like the ListBox, except for the new and modified Methods. The CustomerListBox Effective Object is the Fully Inherited View of the Customer List Box. It shows the end result of the inheritance, overrides, and additions to the CustomerListBox object. Data Objects are inherited in the same way that Methods are inherited. ListBox itself may inherit from another class.

Figure 13A:
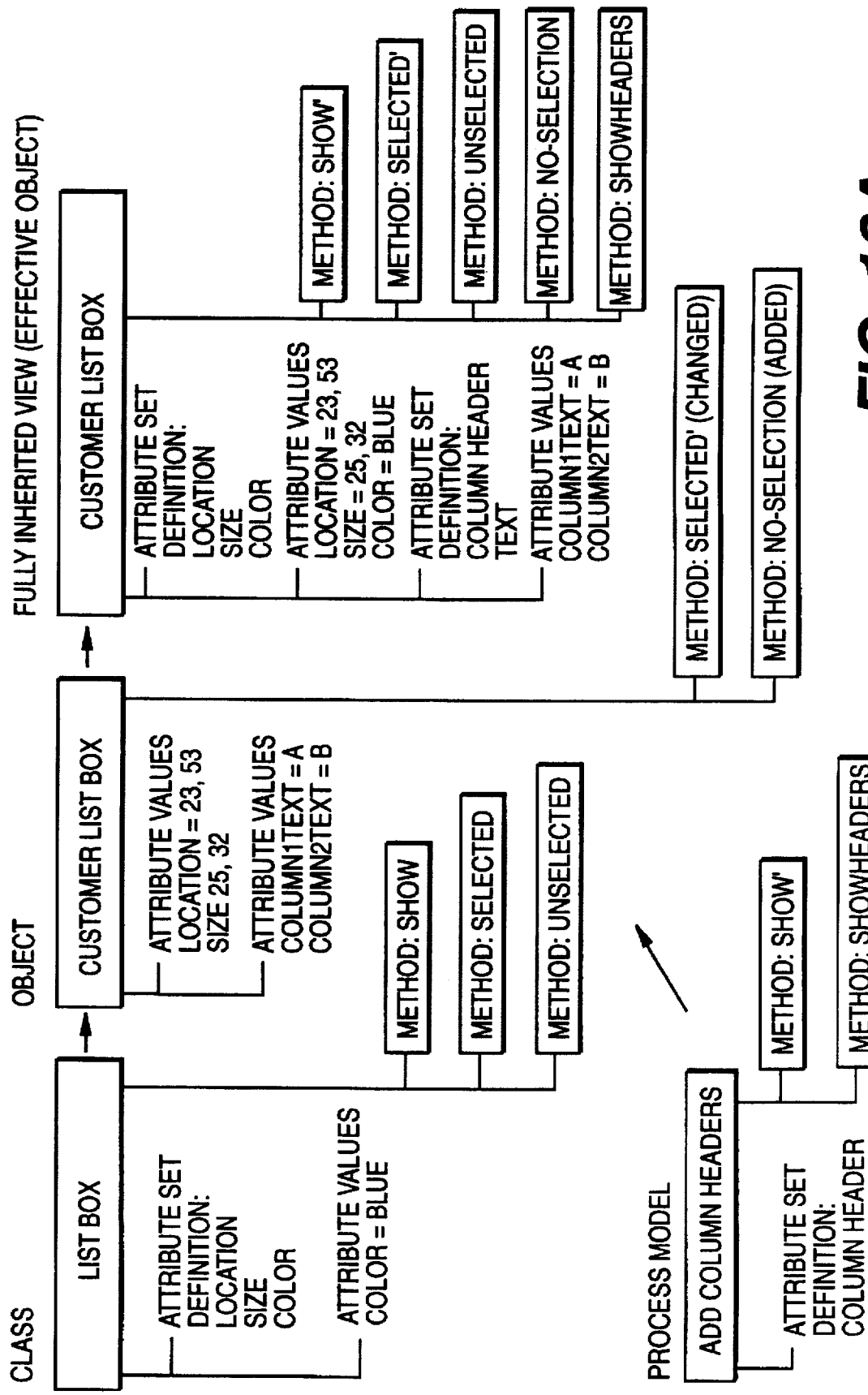
FIG. 13A is a model of an object inheriting attributes from a class and from a Process Model.

FIG. 13A shows the same process shown in FIG. 12, with the addition of a Process Model. The Process Model in FIG. 13A adds column headers to a ListBox. The Process Model adds an Attribute Set Definition for the text that is used for column headers, replaces the Show Method from the ListBox Object with a Show' Method, and adds a ShowHeaders Method that is used by the Show' Method.

The addition of this Process Model causes the CustomerListBox Object to have new Attribute Values, for the column header text. The Effective Object for this process shows that the Process Model's Methods override the class Object's Methods and the CustomerListBox Methods override all inherited Methods. Data Objects are inherited in the same way that the Methods are inherited.

Figure 13B:
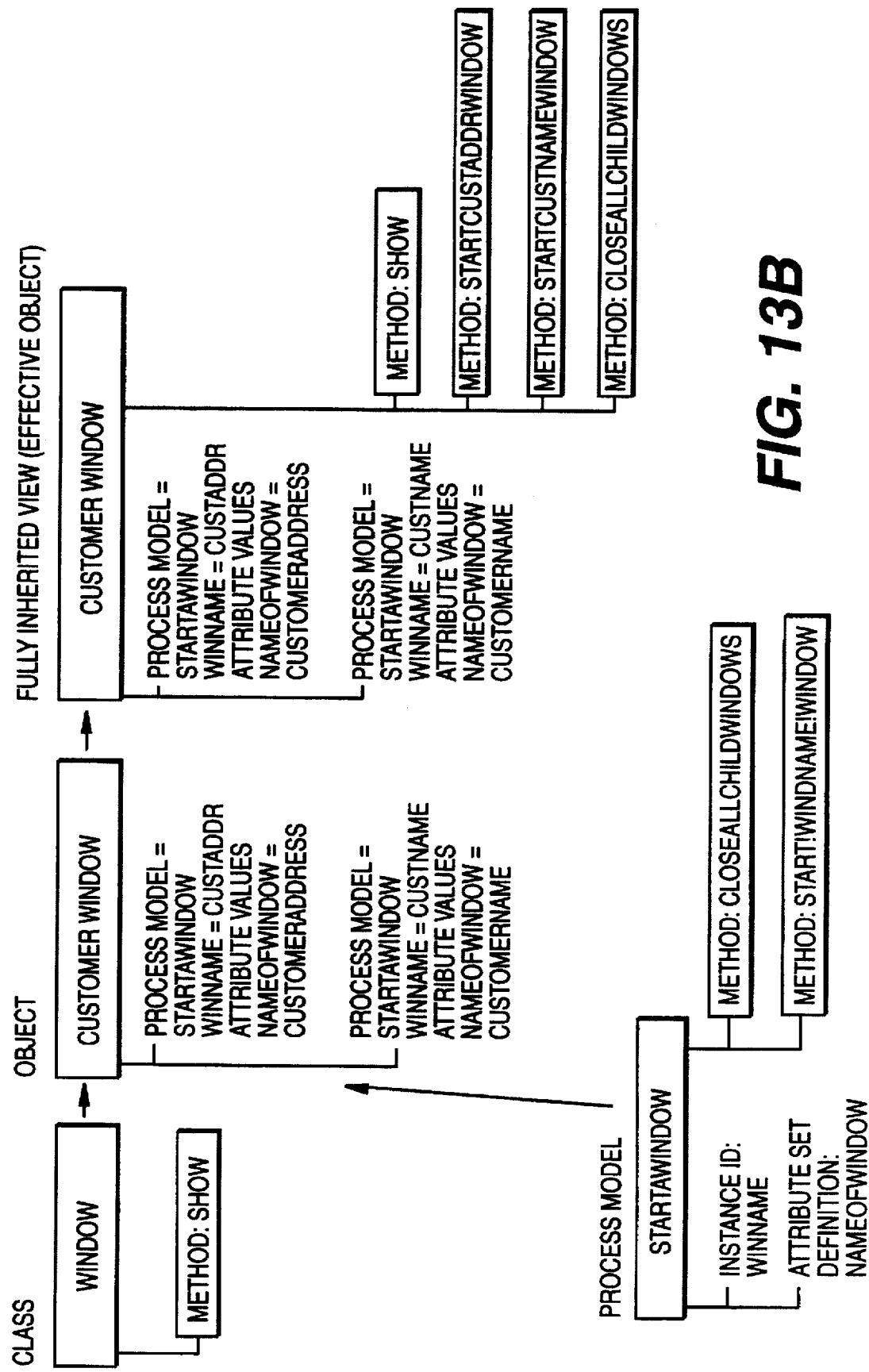
FIG. 13B is a model of an object inheriting a Process Model (StartAWindow) twice.

FIG. 13B shows a second case of inheritance, with the same Process Model being inherited twice. The Instance Id is required on any Process Model that may be attached to an object more than once. FIG. 13B shows how the Instance Id is used to rename Methods so as to uniquely identify each Method. The Method Start!WindName!Window, is used to start a child window. A child window is started using its own name, so the Method used to start the Window must be unique for each child window that will be started. In other words, the Method used to start the CustomerName window must be different from the Method used to start the CustomerAddress window. The Instance Id accomplishes this by replacing the !WindName! place holder with the value for the Instance Id. The Method inherited from the first Process Model is named StartCustAddrWindow, and the Method inherited from the second Process Model is named StartCustNameWindow. The Instance ID thus allows the same Method to be inherited multiple times with different names. Similarly, the Attribute Values are separately identified to keep them distinct.

In some cases, unique Methods are not needed for each instance of a Process Model. In FIG. 13B, the Method CloseAllChildWindows is identical for each instance of the Process Model. This is because it simply closes all child windows, without regard to the name or type of window it is closing. In this case, the placeholder is not used in the name, so each instance of the Method that is inherited replaces any other Methods of the same name. The result is that the Method CloseAllChildWindows is inherited only once, saving memory and reducing the time needed to generate the code.

FIG. 14 is an example of the Developer's language. The Developer's language defines the functionality of the generated application. The syntax used in FIG. 14 is described in the Language Definition section below.

FIG. 15 is an example of the Modeler's language. The Modeler's language directs the generator in its tasks, but does not define the functionality of the generated application. The Modeler's language is used to define how to generate the functionality described by the Developer's language. The syntax of the Modeler's language is also described in the Language Definition section below.

Figure 16:
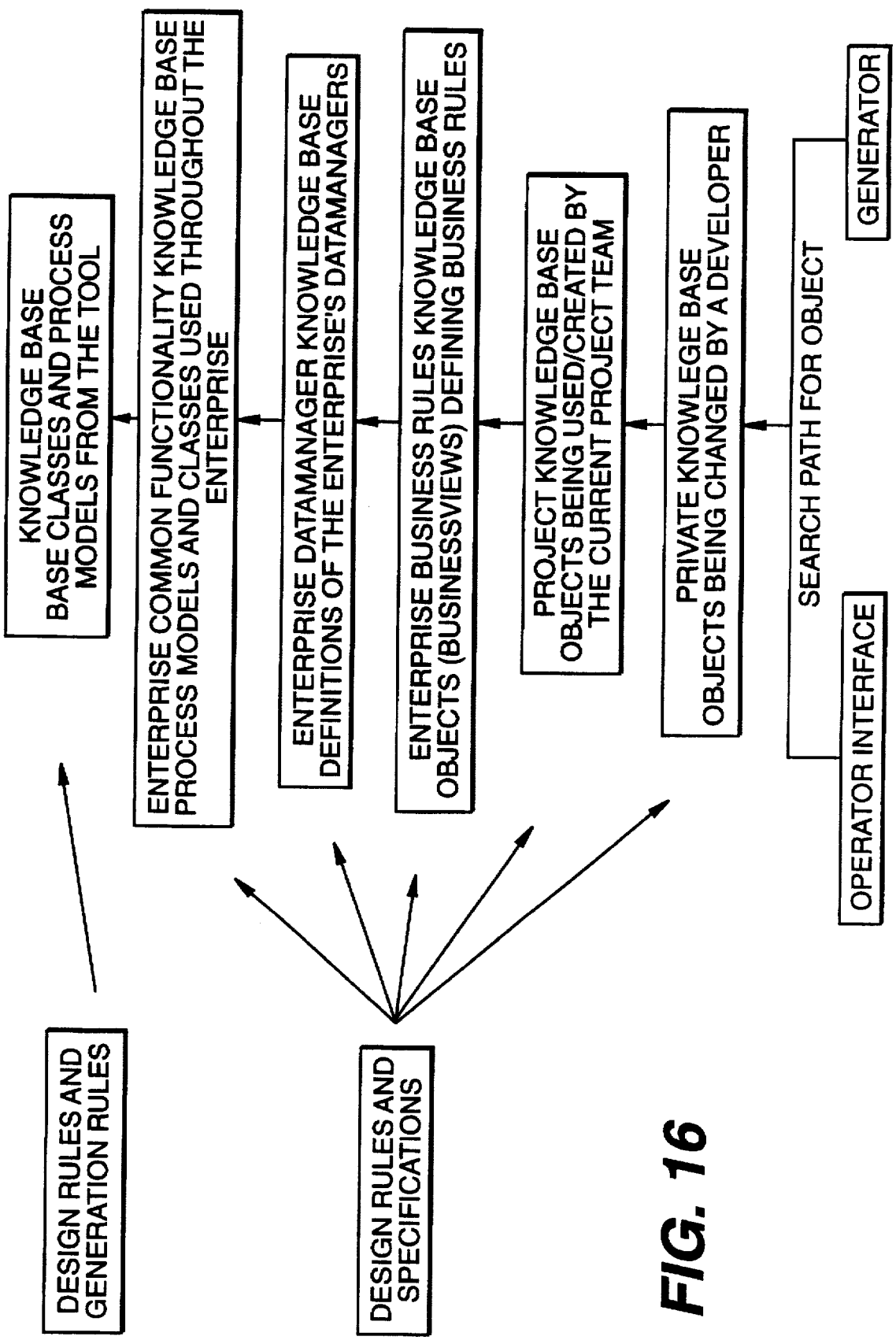
FIG. 16 is an example of a concatenated Knowledge Base.

FIG. 16 is an example of the Concatenated Knowledge Base structure. This structure allows a Developer to view all the Knowledge Bases as a single large Knowledge Base. By segmenting the Knowledge Bases into separate files, a team of Developers can work on the same project, creating and managing objects. Each Knowledge Base contains objects, classes, and Process Models, storing the information shown in FIG. 11.

FIGS. 17 through 24 are flowcharts for typical Knowledge Base Methods and Functions. The Generator is able to generate almost anything. In this implementation, it is driven by the Knowledge Base to generate C code. Each of the examples in FIGS. 17 through 24 are specific to generating C code. Different examples would apply when the generator is used for generating other languages or for other purposes.

Figure 17:
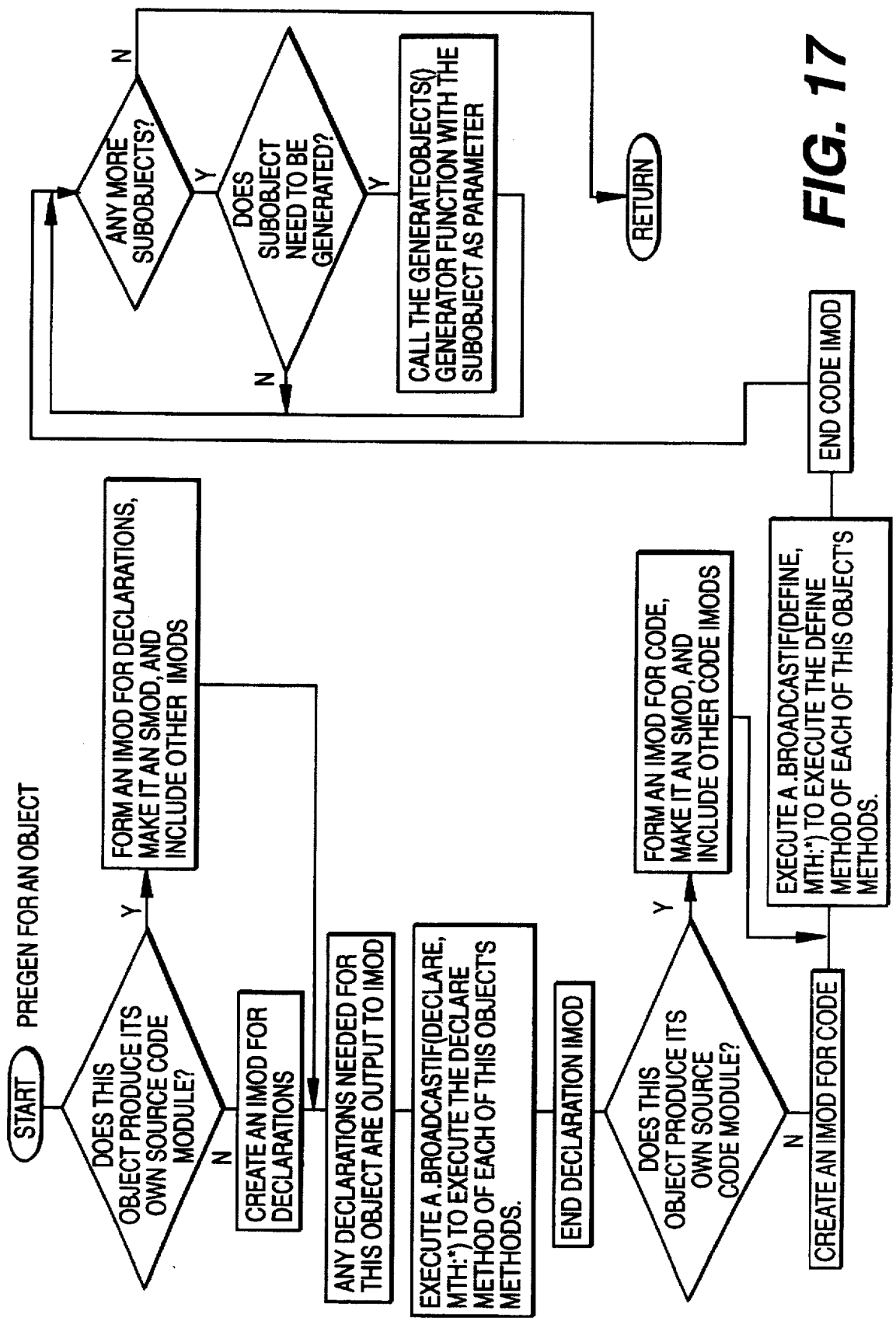
FIG. 17 is a flow chart of an example of a preGen Method.

FIG. 17 shows an example preGen Method. The preGen Method is found on a generatable object (identified by the informational flag that is part of the object structure shown in FIG. 11). It is used to produce any special declarations needed for the object, to produce all of the declarations needed for the Methods in the object, and to cause all of the source code of the Methods in the object to be generated. IMODs are used to store the generated code, which is output to the IMOD as each statement is processed and when StartSrc blocks are encountered (FIG. 7C). The section on Generation discusses this process in more detail.

Figure 18:
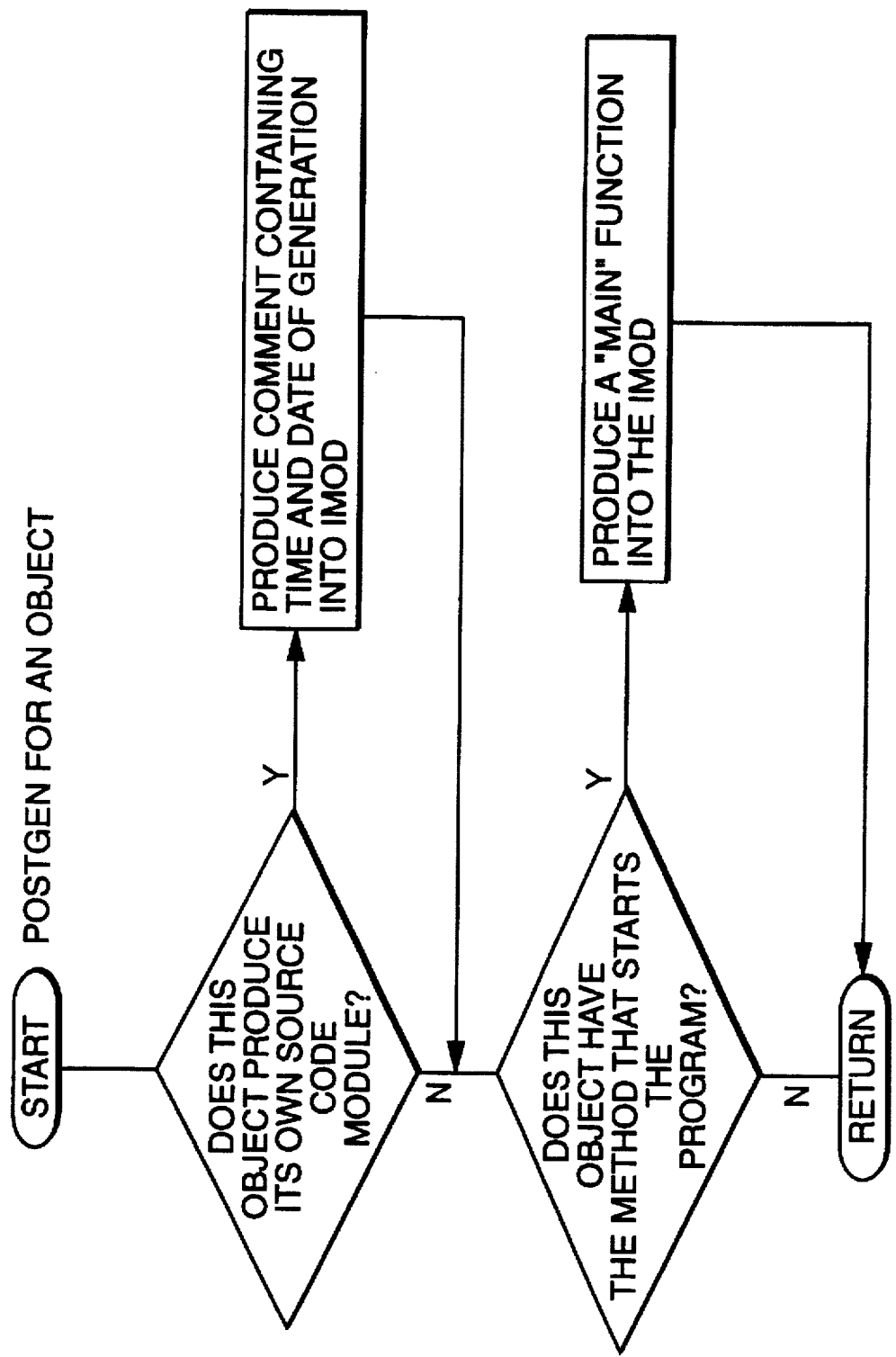
FIG. 18 is a flow chart of an example of a postGen Method.

FIG. 18 shows a typical postGen Method. The postGen Method is invoked after an object's preGen Method has executed. The postGen Method typically performs "housekeeping" duties such as generating a comment that indicates the date and time that the object was generated. If necessary, the postGen Method generates the "main" function for an application.

Figure 19:
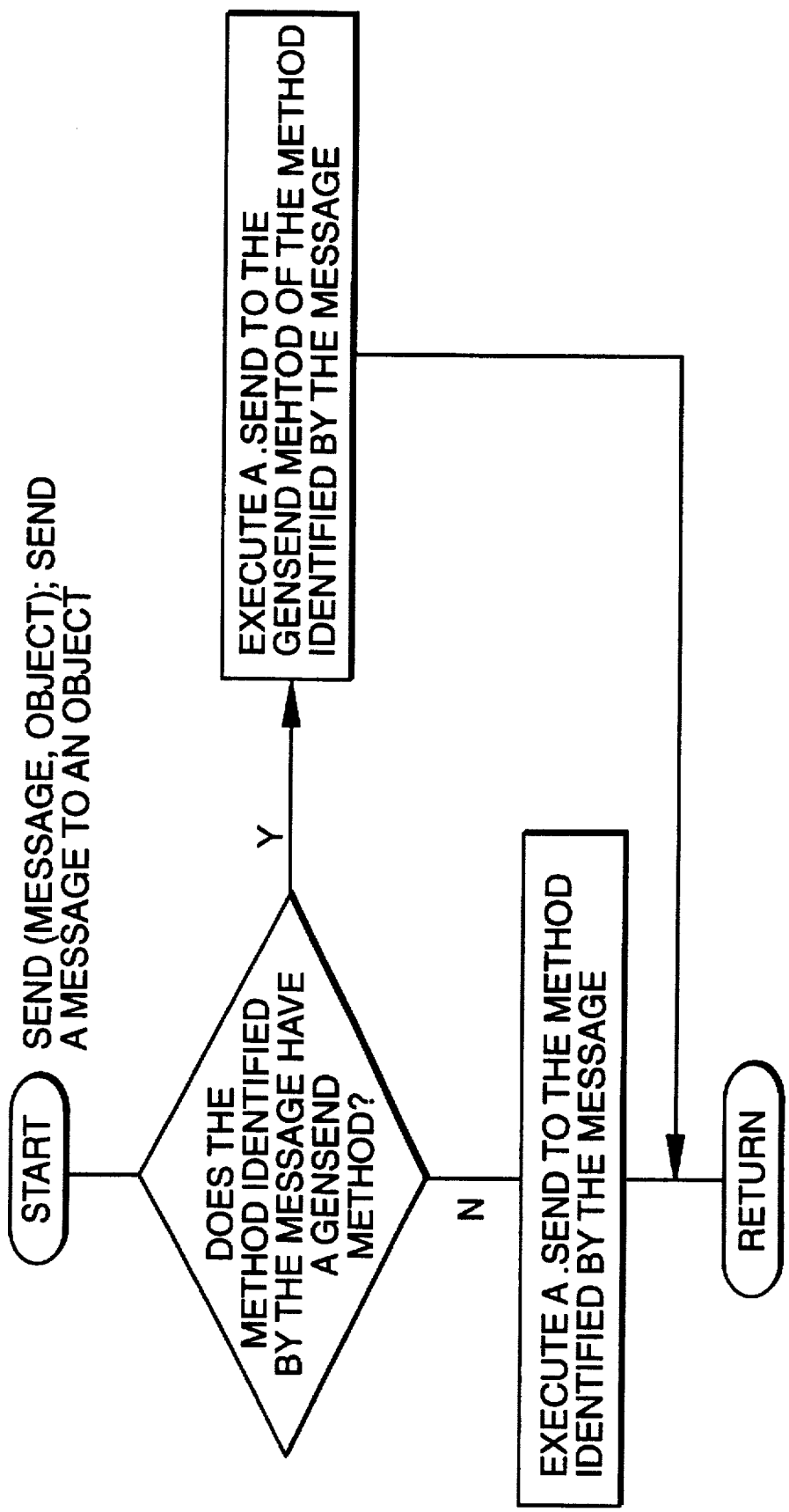
FIG. 19 is a flow chart of an example of a Send function.

FIG. 19 shows a typical Send function. The Send function is executed when a Developer's Send is encountered during the execution of a Script. A Send will, in turn, call the referenced Method's genSend Method to generate a function call to the referenced Method, if a genSend Method exists. If no genSend Method exists, the Send Function will execute the referenced Method directly, causing code to be placed in the current IMOD. This has the effect of creating inline code, instead of a function call.

Figure 20:
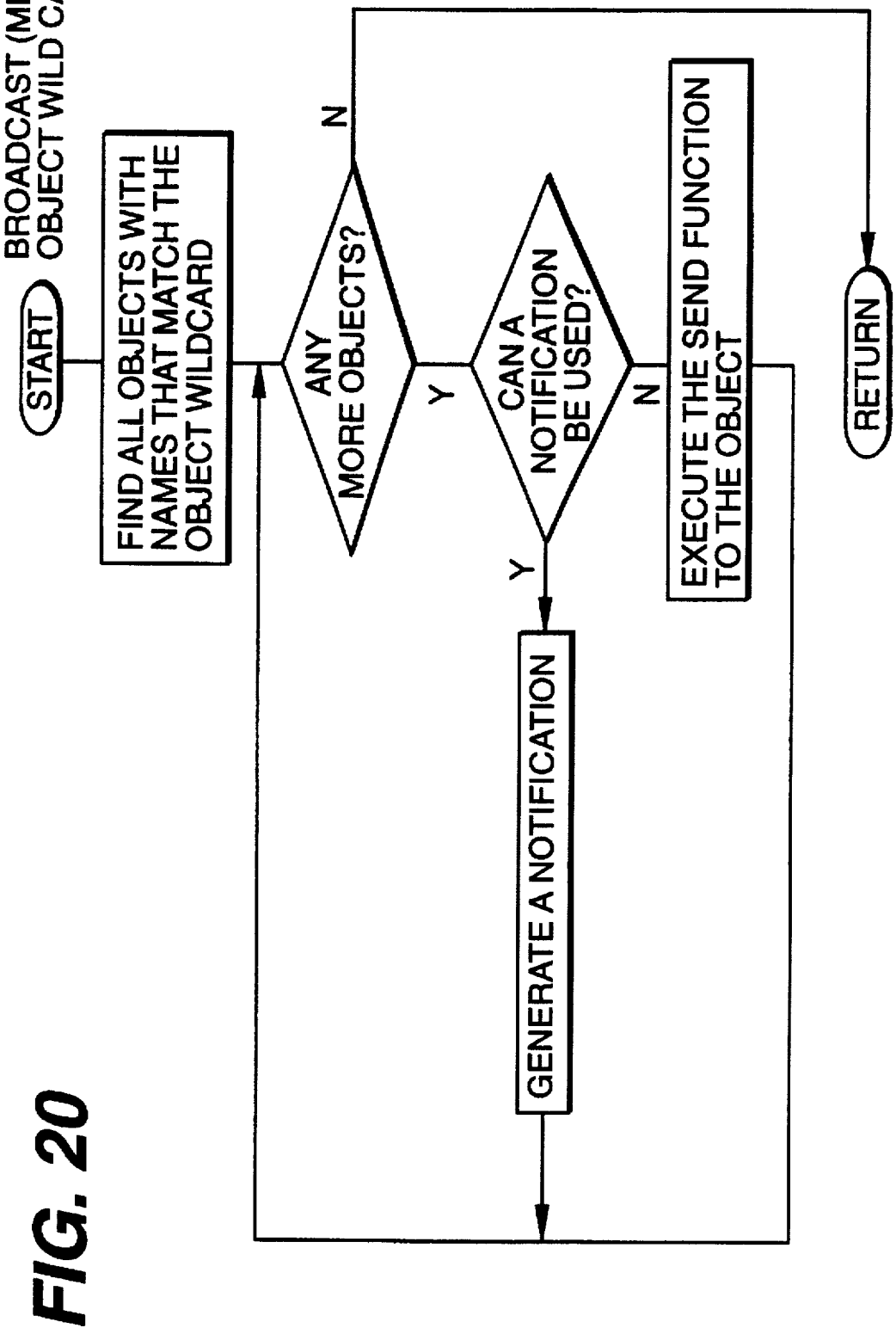
FIG. 20 is a flowchart of an example of a broadcast function.

FIG. 20 is a flowchart of a typical Broadcast function, which is called when a Developer's Broadcast is encountered during Script execution. The Broadcast function will normally cause a Send Function to be executed for each Method that matches the wildcard character given. If a notification can be sent, however, a more efficient means of invoking multiple Functions in the generated code can be generated.

Figure 21:
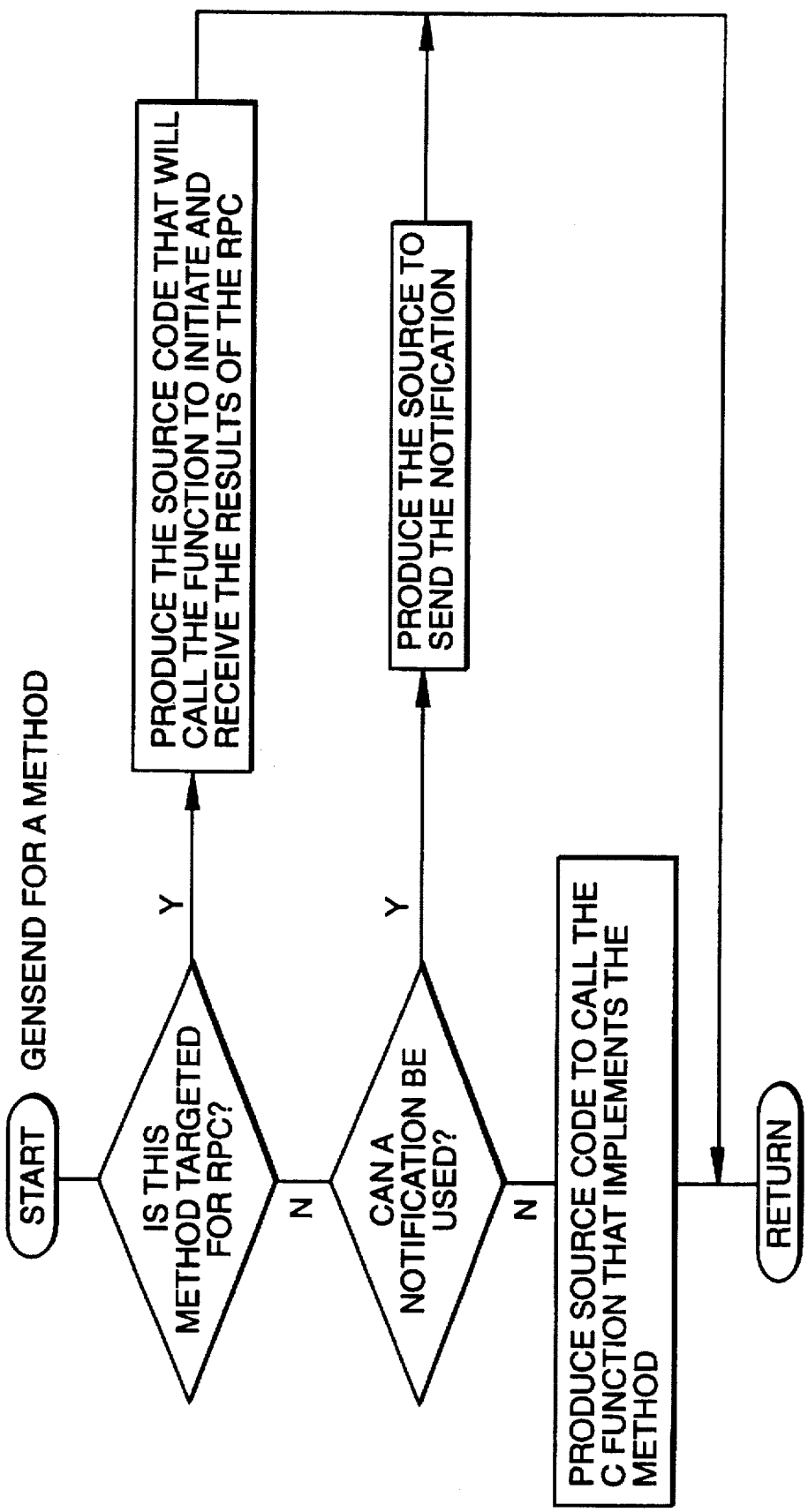
FIG. 21 is a flowchart of an example of a genSend function.

FIG. 21 is a flowchart of a typical genSend Method. genSend is executed by the Send function to generate a function call, notification, or RPC call to the referenced Method. An RPC call is generated, if the object is targeted to be an RPC. Otherwise, a Notification is used if possible, and a function call is used for all others. A Developer's Send in a Script, then, will cause the Send Function to be executed, which will cause the genSend Method to be executed, which will cause a function call, notification, or RPC call to be generated into the current IMOD.

Figure 22:
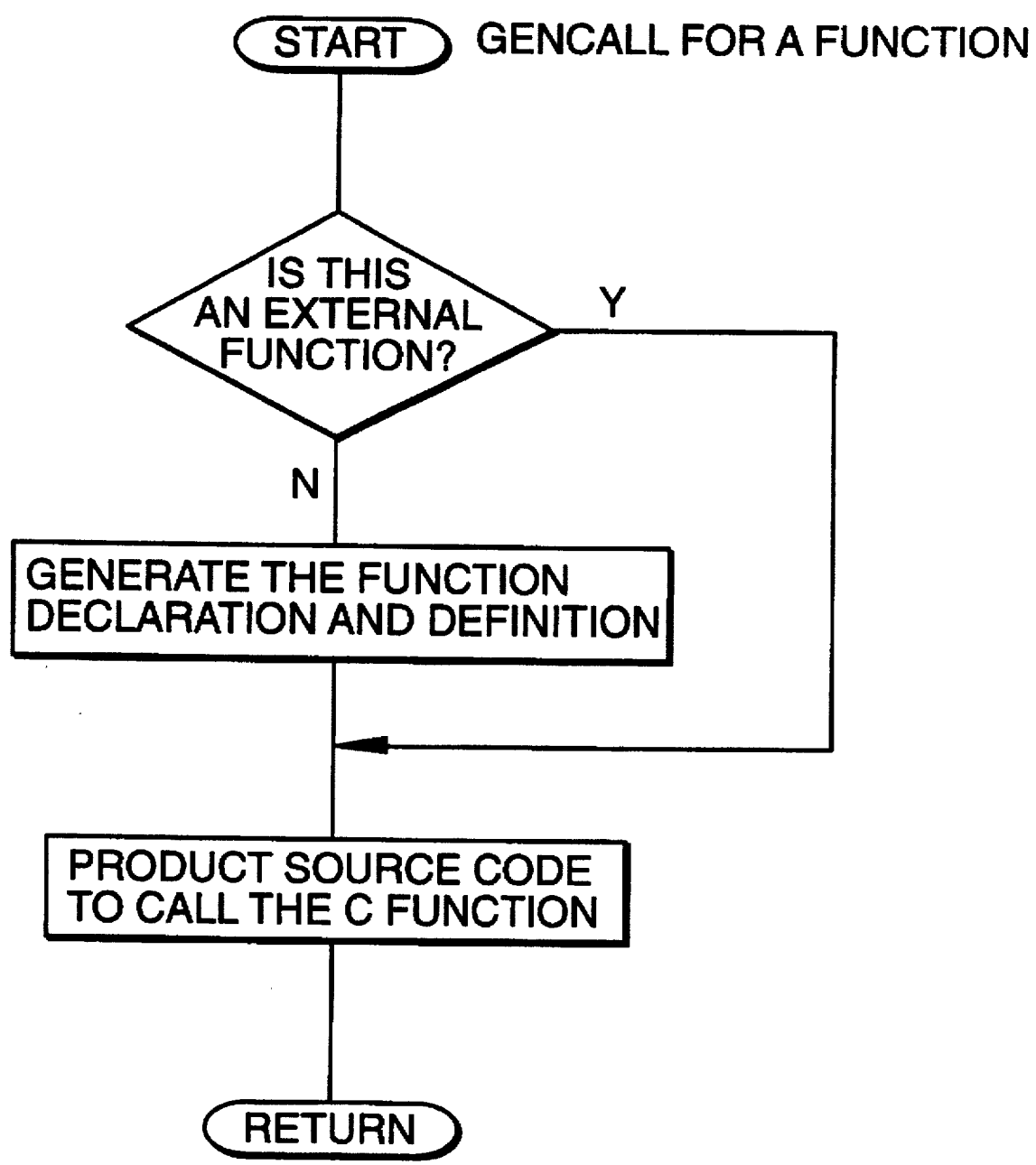
FIG. 22 is a flowchart of an example of a genCall function.

FIG. 22 shows a typical genCall Method. A genCall is used on a Function, much as a genSend is used on a Method. FIG. 7D shows that a Function can be executed or have its genCall Method executed, based upon its High Interface Flag. When a Message is sent to an object, it is sent using a Developer's send (Send) or a Modeler's Send (.send). The Developer's Send executes the genSend Method, if it exists (see FIG. 19). The Modeler's Send causes the Method to be executed directly. When a Function call is made, there is no difference between the Modeler's and Developer's function call. Therefore, the Function's High Interface Flag is used to differentiate between functions that are used to help the Knowledge Base and functions that are used in the generated code.

Function calls may be made to internal or external Functions. Internal Functions are created, much like Methods, with a Script that generates code. An external Function is a reference to functions that exist outside the present invention. These external Functions need only be referenced by the generated code and be linked to the resulting application.

FIG. 23 shows a typical define Method, which is called when an object is generated. The define Method generates the appropriate code for a Method.

Figure 24:
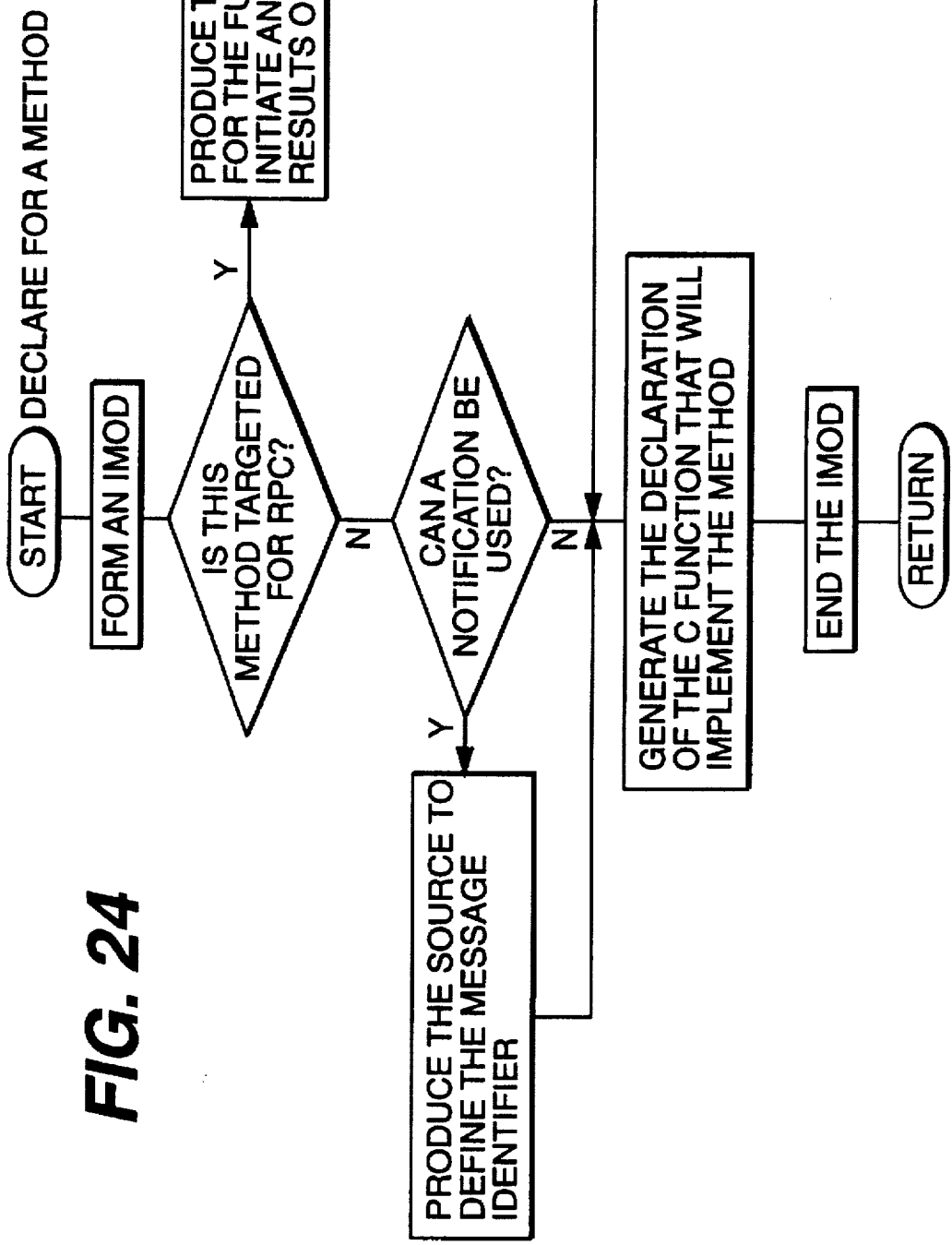
FIG. 24 is a flowchart of an example of a declare Method function.

FIG. 24 shows a typical declare Method, which is also called during an object's generation. Declare generates the declarations used in a header file by any other functions that call the generated function.

FIG. 25 shows some sample Object Types and corresponding classes. Objects are all broken into Object Types to help the Developer choose from a limited list of classes.

Language Definition

This section describes the rules for writing the Modeler's and Developer's language statements, as implemented by the present invention.

Modeler's Language Syntax.

This section provides the complete documentation of the syntactic rules for the Modeler's component of the Language.

Simple Statement vs. Compound Statements

The generator supports two types of statement: simple and compound. A simple statement is a single statement consisting of one operation (the assign operator should be considered an operation). A compound statement is a group of statements (simple or compound).

Flow Control

This section discusses the syntax of the flow control constructs supported in the Modeler's Language. There are three types of flow control allowed: an .if statement, a .switch statement and a .do statement. Each of these is presented separately below.

.if Statement
The format of the .if statement is as follows:
.if (test condition)
    statement
[.else .if (test condition)
    statement]

```
[.else
        statement]
.end
```

The .if statement is required, but the .else .if and .else statements are optional. The test condition can be any statement which meets the conditions outlined under the logical operators section. Statement can be either a simple statement or a compound statement as discussed above. Multiple ".else .if" sections are allowed, but only a single ".else" section may be used.

```
.switch Statement
     The format of the .switch statement is as follows:
.switch (test value)
     [.case (CONSTANT,[CONSTANT, ... ] ) ]
          statement
     [.case (CONSTANT,[CONSTANT, ... ] ) ]
          .
          .
          .
     [.otherwise
          statement]
.end
```

The test value can be any valid non-constant operand. An arithmetic expression is also allowable. Either a minimum one .case statement must be present or the .otherwise statement must be present. A .case statement can have a list of comma-separated values to evaluate the test value against. The statement can be either a simple or compound statement as discussed above.

```
.do Statement
     The format of the .do statement is as follows:
.do statement
          .
          .
          .
     [.while (test condition)] or
     [on some condition, .break;]
          .
          .
          .
     [.continue;]
          .
          .
          .
     [statement]
.end
```

The .while condition can be anywhere within the loop, including the first statement. There can be multiple .while statements within the loop, but at least one .while or .break statement is required. A .break statement will terminate loop execution immediately. A .continue statement will cause the loop to iterate again starting at the beginning. Any statements which follow the .continue statement will not be executed. In general, a .break or .continue statement would always occur within an .if construct.

Logical Operators

This section discusses the logical operators supported by the Modeler's Language. The evaluation of a logical expression always results in a Boolean value of TRUE or FALSE. This section is divided into three parts: operators which support mixed data types, operators which require equivalent data types (a string and a name are equivalent types, but are not identical types), and Boolean operators.

Mixed-Data Operators

At present only two operators will allow mixed types: the equivalence and the non-equivalence operators. This is because the comparison for equivalence or non-equivalence can always make sense even when the types are not the same. A least common type can always be used. For example, comparing a number and a string can always convert the number to a string and the compare the two strings for equivalence. For operators which compare relative magnitude, it is not obvious which way a comparison should be made when the types are not equivalent. The format for the equivalence and non-equivalence comparisons is as follows:

| | |
|---|---|
| Value1 = Value2 | Tests Value1 for equivalence to Value2. Result is TRUE if equivalent, FALSE otherwise. |
| Value1 NOT = Value2 | Tests Value1 for non-equivalence to Value2. Result is TRUE if not equivalent, FALSE otherwise. |

Equivalent-Type Operators

Equivalent-type operators are those which can only operate on values whose types are equivalent. For example, an Object name and a string would be equivalent types, so these operators could be used to compare them. However, a string and a number would not be equivalent types, so these operators could not be used to compare them since you can not make a comparison which makes sense. Like the mixed type operators discussed above, the result of the comparison is a Boolean TRUE or FALSE. When comparing string types, relative magnitude is determined lexicographically. The following are the operators which require equivalent types and the format for their use:

| | |
|---|---|
| Value1 > Value2 | Determines if Value1 has a larger magnitude than Value2. Result is TRUE if larger, FALSE otherwise. |
| Value1 < Value 2 | Determines if Value1 has a smaller magnitude than Value2. Result is TRUE if smaller, FALSE otherwise. |
| Value1 >= Value2 | Determines if Value1 has an equal or larger magnitude than Value2. Result is TRUE if larger, FALSE otherwise |
| Value1 <= Value2 | Determines if Value1 has an equal or smaller magnitude than Value2. Result is TRUE if smaller, FALSE otherwise |

Boolean Operators

Boolean operators include operators for testing the Boolean value of a value, complementing a Boolean value and logically connecting multiple Boolean values. The Modeler's language supports the following Boolean operators:

Value tests the Boolean value of Value. Result is TRUE if Value is non-zero or TRUE, FALSE otherwise.

NOT Value tests the complement of the Boolean value of Value. Result is TRUE if Value is zero or FALSE, TRUE otherwise.

Cond1 AND Cond2 tests the Boolean value of Cond1 and Cond2. Result is TRUE if Cond1 and Cond2 are TRUE, FALSE otherwise.

Cond1 OR Cond2 tests the Boolean value of Cond1 or Cond2. Result is TRUE if Cond1 or Cond2 is TRUE, FALSE otherwise

Arithmetic Operators

The low-level component of the function language supports the expected set of arithmetic operators. Some of the operators allow types other than numeric, while others will only allow numeric types. We will discuss alphanumeric and numeric operators separately.

Alphanumeric Operators

There are two "arithmetic" operators which support alphanumeric data types: assignment and addition. The addition of two alphanumeric values results in the concatenation of the two. Below is a description of the format for these two operators.

| | |
|---|---|
| Var := Value | Assigns Value to the alphanumeric variable Var. If Value is not alphanumeric, it is converted to its alphanumeric equivalent. |
| Var := Str1 + Str2 | Assigns the concatenation of Str1 and Str2 to the variable Var. |
| Var := Str1 + Value | Assigns the concatenation of Str1 and Value to variable Var. If Value is not alphanumeric, it is converted before concatenation. |
| Var := Value + Str1 | Assigns the concatenation of Value and Str1 to variable Var. If Value is not alphanumeric, it is converted before concatenation. |
| Var := Value1 + Value2 | Assigns the addition of Value1 and Value2 to the variable Var. If both Value1 and Value2 are numeric, they are added before conversion to an alphanumeric value. |

Instead of assigning the results of the concatenation operation to a variable, the result can be used as a value passed to another function. Anywhere the term Value[n] is used, another arithmetic expression could appear. For example, you could concatenate multiple strings in a single statement. The right hand side of the expression will be completely evaluated before assignment to the left hand side occurs, so you could insert a string at the beginning of another using the following: Var :=Str1+Var.

Numeric Operators

The Modeler's Language will support the requisite set of arithmetic operators: assignment, addition, subtraction, multiplication, division and modulo division. In addition, parentheses can be used for scoping. When appropriate, these operators can be used for both numeric and alphanumeric operands. Below is a list of the syntax for each.

| | |
|---|---|
| Var := Value | Assigns the value Value to the numeric variable Var. If value is not numeric, it is converted to its numeric equivalent, If it cannot be converted, Var will be assigned 0 and an error will be reported. |
| Var := Value1 + Value2 | Assigns the sum of Value1 and Value2 to the variable Var. |
| Var := Value1 − Value2 | Assigns the difference of Value1 and Value2 to the variable Var. |
| Var := Value1 * Value2 | Assigns the product of Value1 and Value2 to the variable Var. Var := Value1 / Value2 Assigns the quotient of Value1 divided by Value2 to variable Var. Var := Value1 MOD Value2 Assigns the remainder of Value1 divided by Value2 to Var. |

Instead of assigning the results of the arithmetic operation to a variable, the result can be used as a value passed to another function. Parentheses can be used to enforce the required evaluation order of the arithmetic expression.

String Manipulation Operations

The following section is a description of the syntax for the string manipulation functions provided in the Modeler's Language.

.findStr Operation

The .findStr operation locates an occurrence of a string within another. It returns the zero-based offset to the string. A return value of −1 indicates that the search string was not found. To allow searching for multiple occurrences of the same string within a string, a starting position must be provided. To find the first occurrence, use a starting position of 0. To find the next occurrence, use the value returned by the previous call plus one. The format is as follows:

Offset :=.findStr (Str, SearchStr, Startpos);

where:

Offset is a variable to hold the return value,

Str is the string to search;

SearchStr is the string for which to search; and

Startpos is the offset within the string from which to start the search.

.rfindStr Operation

The .rfindStr operation locates the last occurrence of a string within another. It returns the zero-based offset to the string. A return value of −1 indicates that the search string was not found. The format is as follows:

Offset :=.rfindStr (Str, SearchStr);

where:

Offset is a variable to hold the return value;

Str is the string to search,; and

SearchStr is the string for which to search.

.incStr Operation

The .incStr operation increments a string in such a way the incremented value will be lexicographically greater than the prior value. All characters will remain within the character class they were originally in, but rollover between characters will be provided. For example, a lower case letter will remain a lower case letter, an upper case letter will remain an upper case letter and a numeric digit will remain a numeric digit. The last character is incremented and if it must rollover to maintain its character class, the character to its left is also incremented. Any rollover is propagated as far up the string as necessary. The format is as follows:

.incStr (Str);

where:

Str is the string to increment.

.decStr Operation

The .decStr operation decrements a string in such a way the decremented value will be lexicographically less than the prior value. All characters will remain within the character class they were originally in, but rollover between characters will be provided. For example, a lower case letter will remain a lower case letter, an upper case letter will remain an upper case letter and a numeric digit will remain a numeric digit. The last character is decremented and if it must rollover to maintain its character class, the character to its left is also decremented. Any rollover is propagated as far up the string as necessary. The format is as follows:

.decStr (Str);

where:

Str is the string to decrement.

.strLen Operation

The .strLen operation returns the length of a string. The format is as follows:

Len :=.strLen (Str);

where:

Len is a variable to hold the return value; and

Str is the string to determine the length of the string.

.extractStr Operation

The .extractStr Operation extracts a sub-string from a string and puts it into another string variable. The format is as follows:

.extractStr (Str, Startpos, Length, DestStr);

where:

Str is the string from which to extract the sub-string;

Startpos is the starting position of the sub-string to extract;

Length is the length of the sub-string to extract; and

DestStr is the string variable to which to write the sub-string.

.insStr Operation

The .insStr operation inserts a string within another string. Since the starting position for the insert must be supplied, it can be used to insert at the beginning, append to the end or insert within a string. To insert at the beginning, use a starting position of zero. To append to the end, use a starting position of the length of the string (as returned by the .strLen operation) plus one. To insert within the string, use the offset to the character to insert in front of as the starting position. The format is as follows:

insStr (Str, Startpos, InsStr);

where:

Str is the string to insert into;

Startpos is the starting position for the insertion as discussed above; and

InsStr is the string to insert.

.delStr Operation

The .delStr operation deletes a sub-string from within a string. Since it takes a starting position for the deletion and a number of characters to delete, it could be used to clear a string variable, but an assignment using a null string is probably better. The format is as follows:

.delStr (Str, Startpos, Length);

where:

Str is the string from which to delete the sub-string;

Startpos is the starting position from which to delete; and

Length is the number of characters to delete.

.repStr Operation

The .repStr operation replaces a sub-string within a string with another. Since it takes a starting position, length and replacement string, it could be used as a replacement for both .insStr and .delStr, but the other operations are more obvious. The format is a follows:

.repStr (Str, Startpos, Length, RepStr);

where:

Str is the string in which to perform the replacement;

Startpos is the starting position at which to begin the replacement;

Length is the number of characters to replace (0 is valid); and

RepStr is the string to use as the replacement (a null string is valid).

Special Operations

The following special operations are used during source code generation. These operations are used to create intermediate modules and to define collating instructions.

.formImod Operation

.end Operation

The .formImod operation defines the start of an intermediate module. The .end operation terminates an intermediate module. During generation, when a .formImod is executed, the generator discontinues output to the current intermediate module, and opens a new intermediate module. It then begins writing source lines into the new intermediate module, until another .formImod operation is encountered, or until an .end operation is encountered. When the generator encounters an .end operation, it closes the current intermediate module, and writes source lines into the previously opened intermediate module. If the generator encounters a .formImod operation having the same name as that of an existing intermediate module, it will skip the subsequent lines until it encounters the .end operation corresponding to that .formImod operation. The format is as follows:

.formImod(ImodName)

.end where:

ImodName is a string that represents the name to be given the intermediate module.

.nameSmod

The .nameSmod operation identifies an intermediate module that is to become a source module. Source modules are modules of source code that are output by the generator. When generation is complete, a file is created to receive the source code lines contained in the named intermediate module, and any other intermediate modules that may have been named using the .include operation (see below). The format is as follows:

.nameSmod(ImodName, SmodName)

where:

IMODName is the name of the intermediate module; and

SMODName is the name that will be given to the source code module.

.include Operation

The .include operation is used to provide collation instructions to the generator. The operation identifies zero or more modules that are to be inserted into the currently open intermediate module. The format is as follows:

.include(WildcardName)

where:

WildcardName is a parameter that matches the name of zero or more intermediate modules. It may contain one or more wildcard characters. If the WildcardName contains wildcard characters, intermediate modules whose names match the WildcardName are inserted in alphabetical order.

.bufferOutput Operation

The .bufferOutput operation temporarily re-routes source code from the open IMOD to a temporary (unnamed) buffer. The format is as follows:

```
.bufferOutput( )
```

.dumpBuffer Operation

The .dumpBuffer Operation controls the contents of the temporary buffer. The contents of the buffer may be output to the current intermediate module, they may be output to the current intermediate module and deleted, or they may be deleted only. The format is as follows:

```
.dumpBuffer (Command)
``` where:

Command is a keyword defining which buffer control option is to be executed.

Developer's Language Syntax

This section provides documentation of the syntax for those elements of the Developer's Language of which the generator is aware.

Flow Control.

The Developer's Language supports flow control constructs for conditional execution of other statements, execution of statements based on some value, as well as two types of looping. Many of these constructs have equivalent functions in the Modeler's Language. To differentiate the two languages, the statements in the Developer's Language begin with an upper case letter, whereas the statements in the Modeler's Language each begin with a period (.) and a lower-case letter.

```
If statement
The format of the If statement is as follows:
If (test condition)
        statement(s);
[ElseIf (test condition)
        statement(s);]
    .
    .
    .
[Else
        statement(s);]
End
```

The If portion of the statement is required. The test condition is any logical expression which meets the constraints outlined in the section on logical operators in this appendix. One or more statements will follow the If, ElseIf and Else statements. ElseIf statements are optional.can follow the statements after the If. The Else statement is also optional, but only a single Else statement is allowed. The End statement is required.

Switch Statement

The Switch statement provides a mechanism for executing a series of statement when the evaluation of a value yields a specified value. The format for the Switch statement is as follows:

```
Switch (test value)
    [Case (Constant, [Constant, ... ] )
        statements;
```

```
        End
    [Case (Constant, [Constant, ... ] ) ]
    .
    .
    .
    [Otherwise
        statement(s);]
    End
```

The test value must be a data object, since the switch can only be performed for a non-constant value. Either a Case statement or the Otherwise statement must be present. Only one Otherwise statement is allowed. A Case statement can have one or more values for which it will be executed.

While Statement

The While statement provides a looping mechanism which supports termination and continuation. There is no support for initialization or defining an iterator. You should use a For statement if you need these elements. The syntax is as follows:

```
While (test condition)
        statement(s);
        [Break;]
        [Continue;]
        statement(s);
End
```

The test condition must conform to the requirements listed in the section on logical operators. The loop can contain multiple statements. The Break and Continue statements are optional since there is a test condition for terminating the loop. Multiple Break and Continue statements are allowed, although they would typically occur inside of an If construct.

For Statement

The For statement provides a looping mechanism which supports termination and continuation as well as supporting initialization and defining an iterator. The For statement should be used if those elements are needed. Otherwise, a While statement should be used. The syntax is as follows:

```
For (initialization, test condition, iterator)
        statement(s);
        [Break;]
        [Continue;]
        statement(s);
End
```

The test condition must conform to the requirements listed in the section on logical operators. The initialization and iterator must be present and must conform to the requirements listed in the section on arithmetic operators in this appendix. The loop can contain multiple statements. The Break and Continue statements are optional since there is a test condition for terminating the loop. Multiple Break and Continue statements are allowed, although they would typically occur inside of an If construct.

Logical Operators.

The Developer's Language supports the normal set of logical operators: equivalence, non-equivalence, relative magnitude, logical and, logical or and logical complement. Below is the list of operators which are used for each of these conditions. In addition to the operators listed, a Boolean evaluation of a value is allowed by just listing the value as the test. In the current implementation of the present invention, parentheses cannot be used to define the scope of the test conditions.

| = | Test for equivalence |
|---|---|
| NOT = | Test for non-equivalence |
| > | Test for larger magnitude |
| < | Test for smaller magnitude |
| >= | Test for equivalence or larger magnitude |
| <= | Test for equivalence or smaller magnitude |
| AND | Logically "and" two tests |
| OR | Logically "or" two tests |
| NOT | Logically complement a test |

Arithmetic Operators.

The Developer's Language will support the requisite set of arithmetic operators: assignment, addition, subtraction, multiplication, division and modulo division. In addition, parentheses can be used for scoping. When appropriate, these operators can be used for both numeric and alphanumeric operands. Below is a list of the operators.

| = | Assignment |
|---|---|
| + | Addition |
| - | Subtraction |
| * | Multiplication |
| / | Division |
| MOD | Modulo division |

Object Naming Conventions

The following outlines rules for resolving references:
A reference is of the form:

([type:]Name.)[type:]Name where:

a '.' is used as a separator between fields in the reference;
"type" is the type of the name in the field;
a ':' is used within a field to separate the type and the name is in the first field (or only field) of a reference.
References may be one of the following:

| SELF | the object which received the message; |
|---|---|
| OWNER | the immediate owner of the object which received the message; |
| OWNERWIN | the root Window owner of the object which received the message; |
| OWNERBUS | the root Business object owner of the object which received the message; |
| OWNERVEW | the root View owner of the object which received the message; |
| OWNERDMG | the root DataManager owner of the object which received the message; |
| OWNERDST | the root DataStore owner of the object which received the message; |
| ROOT | the penultimate owner of the object which received the message; |
| CLASS | the class of the object which received the message; |
| SENDER | the object which sent the message. |

To resolve a reference, apply the following rules starting with the leftmost field:

1. If the field contains a keyword as described above, but it is not in the first field, report an error. Otherwise, resolve the keyword into the object to which it refers.
2. If the field contains the name of a sub-object or object of the function or method which owns the script, find that object using its name and any optional type information to limit the search.
3. If the field contains an attribute name of an attribute in the working attribute sets for the function or method, the reference is to that attribute. (Note that this must be the last or only field if it is an attribute reference.)
4. If the field contains an attribute group of the function or method, use attribute group.
5. If the field contains an attribute value set of the function or method, use that attribute value set.
6. Otherwise, if the field corresponds to a Subobject of the "SELF" object (see above for definition of SELF), use that object.
7. Finally, if the field corresponds to a global Subobject or object, use the object or Subobject.
8. If no other fields exist, the reference is to whichever object was identified above. If there is another field to the right, it is attempting to reference a component (Subobject, Attribute, Method, etc.) of the object you have identified above. Resolve this reference as described in the preceding steps.

DETAILED DESCRIPTION OF THE GENERATION PROCESS

FIGS. 7A-7D show the generation process. FIG. 7A shows the overall generation process, which is started by creating a Fully Inherited View of the object to be generated. The Generator invokes the GenerateObjects function to cause code generation to occur. Generation occurs by creating a number of Intermediate Modules (IMODs, which are described below), each containing source code and collating instructions. Finally, the generator follows the collating instructions to actually write the code to source code files.

FIG. 7B shows the GenerateObjects function. Every generatable object contains both a preGen Method and a postGen Method. Generation is accomplished by calling the function ExecuteScript for the preGen Method, and then calling the function ExecuteScript for the postGen Method. ExecuteScript executes a Script, i.e., it causes the Generator to parse the Statement into expressions, and then take appropriate action for each expression. GenerateObjects is applied sequentially to each object on the object list.

FIG. 7C shows the ExecuteScript function. ExecuteScript first parses the statements in the object into expressions. It then determines whether the statement includes a fragment of source code. If it does, it outputs all lines of that source code fragment to an IMOD, after substituting target source code names for any imbedded object names in the source code fragment. ExecuteScript then determines whether the expression is a generator operation; an arithmetic or logical expression, an assignment or a flow control; a Modeler's Send Operation; a Developer's Send Operation; or a function call, and acts accordingly.

FIG. 7D is a flowchart showing how function calls are executed. When the Generator encounters a Function call, it causes either the Function or the genCall Method of the Function to be executed, depending upon the High Interface Flag stored with the Function. If the High Interface Flag is not set, it is an internal Knowledge Base Function and the script of the function is executed. If the High Interface Flag is set, then the genCall Method of the Function is executed.

Generator and the Knowledge Base.

The Generation process is performed by the Generator, as instructed by the Knowledge Base. The Generator implements common functions needed to read and parse scripts and generate code. The Knowledge Base implements functions that are dependent upon the language that is generated. This clearly differentiates the Generator implementations from the Knowledge Base. Any Knowledge Base functions that are described in this section are described as they are implemented for generating C code.

Use of Intermediate Code Modules and Source Code Modules

The Generation process uses intermediate code modules (IMODs) to store generated code in memory. An IMOD usually contains a portion of a source code file. The Knowledge Base functions instruct the Generator when to open a new IMOD and how to name it.

The Knowledge Base also instructs the Generator to make IMODs into Source Code Modules (SMODs). An SMOD, unlike an IMOD, will have a "file name" associated with it, so that it can be written to disk as a source code file. The Knowledge Base instructs the Generator which IMODs to include in another IMOD, using the .includeImod generator function. Each included IMOD is written to the target IMOD in the order it is included. The .includeImod function can take a wildcard (*) character to include multiple IMODs with a single directive. The IMODs are included using the alphabetical name of the included IMOD as collating instructions.

This use of IMODs and SMODs provides for a great deal of flexibility when generating code. A C program, for example will typically contain the following code statement types:

Function definitions
Structure definitions
Include file lists
Definition of Constants
Data definitions The use of IMODs and SMODs allows the Knowledge Base to instruct the Generator to group Function definitions and Structure definitions into a single source file, for use as an Include file. In addition, it allows the Knowledge Base to instruct the Generator to group each of the other categories together and place them in the correct order in the SMOD. For example, a C source file may start with a list of directives to Include header files, have all of the constants and data defined at the top of the module, and have only code in the rest of the module. The Knowledge Base uses a separate IMOD for each of the code statement types listed above. For example, whenever the Knowledge Base is generating function definitions, it opens an IMOD used for that code statement. Similar procedures are followed for code, data definitions, constant definitions, include files, etc.

The Knowledge Base, within any one generatable object, follows a consistent naming pattern for IMODs. Names can be of any length and contain any character other than the string termination character (a null character). The Generator will ignore a request to create and write to an IMOD if an IMOD of that name already exists. This has the effect of eliminating duplicate code, since the Knowledge Base will name IMODs consistently. For example, when an object is being referenced (the Generator is executing a preGen, declare, define, genSend, or genCall Method), the Knowledge Base may direct the Generator to create a new IMOD so that a #include directive can be added for a new include file. The Knowledge Base will build up an IMOD name that consists of "SRCINCL.objectname", meaning it contains #include directives, followed by the name of the root object that is causing the directive to be included, followed by a unique name, usually the name of the file being included. The unique name will ensure that the #include directive is only added to the source code file once. The Knowledge Base will use the .include SRCINCL.objectname.*, which will include all of the SRCINCL IMODs into the current SMOD.

The Knowledge Base, as implemented, uses these capabilities in a standard way. This is shown in FIGS. 17, 23, and 24. For example, the following sequence could be used.

1. An object that generates its own code module will create its own IMODs when the preGen Method is executed. To avoid confusion with a parent object which may form a separate code module, the IMOD will be named differently from the parent. The name is usually made unique by including the object's type and short name in the IMOD's name. An IMOD for the header file is created first. The IMOD is given a file name, making it an SMOD.

2. Using the .include generator function, all of the SRCINCL files for this object are included in the IMOD.

3. Any declarations needed for this object are output to the IMOD. These may include data structures that are used by this object and its Subobjects.

4. The preGen Method then executes a .broadcastIf to each of its Method's declare Methods (by using .broadcastif (declare, SELF.MTH:*)). This causes all of the declarations for each of the Methods to be generated.

5. As each declare Method is executed, it will usually create an IMOD named such that it will be included in the object's IMOD (in step 2). If a Method does not create its own IMOD, the declarations will fall into the object's IMOD, which is still open. The Method ends when the declare Method is finished.

6. The preGen Method closes the declare IMOD.

7. A similar process is followed for the define methods. The .include generator function is used to include all of the define IMODs for the object. These Methods generate the code that makes up the application. The IMOD is ended when complete.

8. Each Subobject is generated, producing IMODs for declarations and definitions. These IMODs are included in the parent's IMOD by virtue of the naming conventions used (see step 2 and 7). If one of the object's Subobjects creates its own source code module, that object will use a different naming convention to create IMODs that are not included in the parent's IMODs.

This process creates two source files for each object that generates its own code module: a header file for declarations and a code file for code. It should be obvious that, if needed, any number of files can be output for any object, as defined by the Knowledge Base.

To aid in naming IMODs, the Knowledge Base has a number of functions that are implemented in the Modeler's or Developer's language. These functions are used to provide the name that will be given an object when it is generated, to give the object's root names (so that Subobjects that do not generate a separate code module can easily name IMODs), and other commonly used activities. All of these functions use the generator functions described in this document.

Parsing Statements.

As FIG. 7C shows, every Method contains a Script, which in turn contains a series of Statements. Each statement either is a StartSrc statement, indicating that a Source Code Fragment follows, or can be parsed into a series of Expressions.

The invention uses commonly available parsing techniques to separate Statements into Expressions. Expressions are defined in the Language Definition section. An example of a Statement is A=B+C.

The Generator will parse this Statement by first recognizing B+C as an arithmetic expression, and then executing the "plus(B, C)" Knowledge Base function. It will then execute the "assign(A, return)" function, where "return" is the value returned from the plus function. The result will be a full source code string that implements the original A=B+C statement. This source code string is output to the current IMOD.

Source Code Fragments.

A Source Code Fragment follows a StartSrc statement and is terminated with an End statement. The invention allows a Developer to include a source code fragment within any script. The source code is output as it is written by the Developer. However, any references to objects are first translated so that the generated source code contains references to the proper data names in the generated application. The source code fragment is placed in the current IMOD.

Generator Operations.

Generator Operations are explicit instructions to the Generator. These include starting a new IMOD, writing source code to an open IMOD, and other operations described herein. These are all Modeler's language expressions. The current Generator Operations are described in the section on the Modeler's Language and are listed below:

| String Manipulation Functions | |
|---|---|
| findStr | Find the occurrence of a string within a string |
| rfindStr | Find the last occurrence of a string within a string |
| incStr | Increment a string |
| decStr | Decrement a string |
| extractStr | Extract a sub-string from a string |
| strLen | Find the length of a string |
| delStr | Delete a sub-string from a string |
| insStr | Insert a string into a string |
| repStr | Replace a sub-string within a string |
| Object Manipulation Operations | |
| attach | Makes the values for an attribute set available |
| Special Operations | |
| formIMOD | Form an intermediate code fragment module (IMOD) |
| nameSmod | Name an IMOD to become a source module (SMOD) |
| include | Include an IMOD or a set of IMOD's in another IMOD |
| bufferOutput | Turns output buffering on and off |
| dumpBuffer | Dumps the contents of the output buffer |

Arithmetic or Logical Expression,

Assignment or Flow Control Constructs

Arithmetic or Logical Expression, Assignment or Flow Control Constructs are implemented in Script. These expressions may be written in the Developer's language or in the Modeler's language.

Each of the expressions in this category maps to a function which directs the Generator's handling of the expression. When the function is executed, Generator Operations will cause the proper code to be generated.

The following functions are implemented by the Knowledge Base and are executed directly by the Generator:

| | |
|---|---|
| plus | minus |
| multiply | divide |
| modulo | and |
| not | |
| greaterThan | lessThan |
| greaterThanEqual | lessThanEqual |
| equal | notEqual |
| assign | Switch |
| arithParen | logicalParen |

| | |
|---|---|
| For | While |
| Case | EndCase |
| Otherwise | |
| If | ElseIf |
| Else | EndIf |
| EndFor | EndWhile |
| EndSwitch | Continue |
| Break | Return |

Modeler's Send Operations

A Modeler's Send operation is a Send that is written in the Modeler's language. These include .send, .sendif, .broadcast, and .broadcastif. These operations cause the named Method to be executed by the Generator.

Function Calls

When the Generator encounters a Function call, it causes either the Function or the genCall Method of the Function to be executed, depending upon the High Interface Flag stored with the Function, as described above with respect to FIG. 7D. The genCall Method will build up the appropriate source string to make the function call in the generated code. This is analogous to a Modeler's Send (.send) operation and a Developer's Send (Send) operation, respectively. The High Interface Flag is used on a Function, because the Function is invoked without the Send or .send operator.

Developer's Send Operations

Developer's Send operations are written in the Developer's language to affect the operation of the generated application. The run-time Send operations include Send, SendIf, Broadcast, and BroadcastIf. Each of these are functions in the Knowledge Base, that direct the generator in generating the reference to the Method. As implemented, the Send operation is translated into one of the following code references:

- an Inline class Method will generate the Method instead of the genSend. This has the effect of placing generated code in the current function instead of generating a function.
- genSend will either generate a function call to the target Method or send a Notification. In generating a function call, genSend will use the function name that will be used when the Method is generated. In sending a Notification instead of a function call, genSend will use the native windowing environment's Notification capability. In this case, genSend will build up a string that sends the proper notification. If the Method is targeted as an RPC, genSend will build up the source code statements necessary to invoke a third-party RPC mechanism.

These different options are driven by the targeting for the Method, as interpreted by the genSend Method of the target Method. As the Generator executes the genSend Method, the proper source code is generated.

SendIf Operation

The SendIf operation will send a message to a receiving object only if the receiver is capable of responding to the message. If the receiving object cannot respond, no source code is generated. The receiving object can respond only if it includes a method that has the same name as the method called for. If the receiving object can respond, source code is generated as in a Send operation. The SendIf operation allows classes and process models to use other methods, as they are needed. If the other methods are not needed, the source code corresponding to the other methods is not generated. Thus the source code that is generated is more efficient, because it contains only source code that is actually needed.

Broadcast Operation

The Broadcast operation sends the same message to one or more objects. The receiving objects are identified by a name that may contain one or more wildcard characters. Each object whose name matches the wildcard pattern will receive the message. Source code will be generated as if a separate Send operation had been used for each matching receiving object.

BroadcastIf Operation

The BroadcastIf operation sends a message to zero or more receiving objects. The receiving objects are identified by a name that may contain wildcard characters. Each object whose name matches the wildcard pattern and is capable of responding to the message will receive the message. Source code will be generated as if a separate Send operation had been used for each matching object capable of responding.

*Copyright Dynasty Technologies, Inc.*

The foregoing disclosure of an embodiment of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A computer system for generating source code comprising:
   (a) means for storing objects, wherein each of said objects comprises at least one method;
   (b) means for entering developer specifications by selecting an object, adding methods to the object, modifying methods within the object and deleting methods from the object;
   (c) means for storing the developer specifications as new objects;
   (d) means for entering code generation directions;
   (e) means for storing said code generation directions within objects;
   (f) obtaining means for obtaining code generation rules appropriate to a specific target environment through inheritance;
   (g) means for storing said code generation rules obtained by said obtaining means within objects; and
   (h) means for generating source code from the objects and said code generation rules.

2. The computer system of claim 1, further comprising sub-objects, each sub-object being an object wholly-owned by another object.

3. The computer system of claim 2, wherein sub-objects are accessed by specifying the direct path of objects to the sub-objects.

4. The computer system of claim 1, wherein each object comprises attribute sets.

5. The computer system of claim 1, further comprising means for more than one object to inherit from a same first object.

6. The computer system of claim 1, further comprising means for one object to inherit methods from more than one other object.

7. The computer system of claim 6, wherein instance identifications are used to uniquely identify each inheritance.

8. The computer system of claim 1, wherein at least one object comprises a function.

9. The computer system of claim 1, wherein at least one method comprises embedded source code.

10. The computer system of claim 1, further comprising means for checking the integrity of the developer's specifications.

11. The computer system of claim 1, wherein each object is characterized as belonging to a class, further comprising means for changing the class of objects based upon the specific application for the source code to be generated.

12. The computer system of claim 1, further comprising list process models, and means for objects to inherit from process models.

13. The computer system of claim 12, wherein a single object can inherit from more than one process model.

14. The computer system of claim 1, wherein the means for generating source code comprises means for invoking methods connected to a target method.

15. The computer system of claim 1, further comprising means for sending a message to a receiving object, such that the message is only sent if the receiving object is capable of responding to the message.

16. A method for generating source code using a computer system having means for storing objects, methods and generation rules, and means for generating source code comprising:
   (a) entering developer specifications by selecting an object, adding methods to the object, modifying methods within the object and deleting methods from the object;
   (b) storing the developer specifications as new objects;
   (c) entering code generation directions;
   (d) storing the code generation directions within objects; and
   (e) generating source code from the objects and the generation rules.

17. The method of claim 16, wherein the computer system further comprises process models, and wherein developer specifications are entered by adding process models to the object, as well as by adding methods to the object, modifying methods within the object and deleting methods from the object.

18. The method of claim 16, wherein each object is characterized as belonging to a class, further comprising changing the class of objects based upon the specific application for the source code to be generated.

19. The method of claim 16, further comprising creating objects having a fully inherited view.

20. The method of claim 16, further comprising inheriting generation rules appropriate to a target environment.

21. The method of claim 16, wherein step (f) comprises creating intermediate modules comprising source code and collating instructions.

22. The method of claim 21, wherein step (f) further comprises creating a source code module from at least one intermediate module.

23. The method of claim 16, further comprising the step of checking the integrity of the developer specifications.

24. The method of claim 16, wherein at least one object comprises sub-objects.

25. The method of claim 16, wherein each object comprises attribute sets, and step (b) further comprises filling in attribute value sets corresponding to the attribute sets.

26. The method of claim 16, wherein more than one new object is created from a first object.

27. The method of claim 16, further comprising inheriting methods from more than one other object.

28. The method of claim 27, further comprising using instance identifications to uniquely identify each inheritance.

29. The method of claim 16, further comprising sending a message to a receiving object only if the receiving object is capable of responding to the message.

30. The method of claim 16, wherein at least one method comprises methods.

31. The method of claim 16, further comprising generating program documentation describing the objects used and classes inherited from each object, and listing methods added to each object.

32. The method of claim 16, wherein step (f) comprises generating source code by invoking methods connected to a target method.

33. A method for generating source code using a computer system having means for storing objects, methods and generation rules, and means for generating source code comprising:

(a) entering developer specifications in a developer's language and storing the developer specifications in objects;

(b) entering code generation directions in a modeler's language and storing the code generation directions in objects;

(c) creating objects having a fully inherited view; and (d) generating source code for a specific application, using objects containing the entered developer specifications and code generation directions, and using the generation rules.

34. The method of claim 33, further comprising creating sub-objects within objects.

35. The method of claim 33, wherein the computer system also comprises means for storing objects as classes, further comprising the step of creating a new object, said new object having inherited the characteristics of a class.

36. The method of claim 35, further comprising the step of changing the class of an object according to the specific application.

37. The method of claim 35, further comprising the step of changing the class of an object according to a target code.

38. The method of claim 35, wherein more than one new object is created from a first object.

39. The method of claim 35, further comprising inheriting methods from more than one other object.

40. The method of claim 39, further comprising using instance identifications to uniquely identify each inheritance.

41. The method of claim 35, further comprising sending a message to a receiving object only if the receiving object is capable of responding to the message.

42. The method of claim 35, wherein each object comprises at least one method.

43. The method of claim 35, wherein at least one method comprises embedded source code.

44. The method of claim 35, wherein each object comprises attribute sets, further comprising the step of filling in attribute value sets corresponding to the attribute sets.

45. The method of claim 35, wherein at least one method comprises a function.

46. The method of claim 35, wherein the computer system also comprises means for checking the integrity of the developer specifications, further comprising the step of checking the integrity of the developer specifications.

47. The method of claim 35, wherein each object comprises a developer-controlled flag, that indicates whether the object is to be used as a class.

48. The method of claim 35, wherein the computer system also comprises process models, and wherein each object comprises a list of process models that are appropriate for that object to use.

49. The method of claim 35, wherein methods that are not relevant to an application are not visible.

50. The method of claim 33, wherein step (c) comprises creating an inverted tree structure having nodes, the first node of the inverted tree structure being the object of which the fully inherited view is being constructed.

51. The method of claim 33, wherein step (d) comprises generating source code by invoking methods connected to a target method.

52. A method for generating source code using a computer system having means for storing classes, objects, methods, process models, functions and generation rules, and means for generating source code comprising:

(a) selecting a class;

(b) creating a new object from the selected class, said new object inheriting the characteristics of the class;

(c) editing the new object by adding and deleting components of the object, said components being selected from sub-objects, methods, functions and process models;

(d) repeating steps (a)–(c) to create additional new objects, as required by a specific application;

(e) generating source code for the specific application, using the new objects and the generation rules.

53. The method of claim 52, wherein the new object has an attribute set, and step (c) comprises filling in an attribute value set corresponding to the attribute set.

54. The method of claim 52, wherein objects have integrity, further comprising the step of checking the integrity of the new objects.

55. The method of claim 52, further comprising the step of creating a fully inherited view of at least one new object.

56. The method of claim 55, wherein each object comprises at least one method.

57. The method of claim 56, wherein at least one method comprises a function.

58. The method of claim 56, wherein at least one method comprises embedded source code.

59. The method of claim 55, wherein at least one object comprises sub-objects.

60. The method of claim 55, further comprising changing the class of the object according to the specific application.

61. The method of claim 60, further comprising the step of creating a new object from a previously-created first object.

62. The method of claim 61, further comprising the steps of creating more than one new object from a previously created first object.

63. The method of claim 55, further comprising inheriting methods from more than one other object.

64. The method of claim 63, further comprising using instance identifications to uniquely identify each inheritance.

65. The method of claim 55, further comprising sending a message to a receiving object only if the receiving object is capable of responding to the message.

66. The method of claim 55, wherein step (e) comprises storing generated source code in intermediate modules.

67. The method of claim 66, further comprising converting an intermediate module into a source code module by assigning a file name to the intermediate module.

68. The method of claim 66, further comprising the process of including at least one intermediate module within another intermediate module.

69. The method of claim 55, wherein step (c) comprises selecting methods from more than one process model.

* * * * *